Dec. 1, 1964     R. J. FIBIKAR ETAL     3,159,059
FULLY AUTOMATIC SINGLE STATION BALANCING MACHINE
Filed June 13, 1955     15 Sheets-Sheet 1

INVENTORS:
Werner I. Senger
Robert J. Fibikar
BY
*Andrus & Siedler*
ATTORNEYS.

Dec. 1, 1964 R. J. FIBIKAR ETAL 3,159,059
FULLY AUTOMATIC SINGLE STATION BALANCING MACHINE
Filed June 13, 1955 15 Sheets-Sheet 2

INVENTORS:
Werner I. Senger
Robert J. Fibikar
BY
Andrus & Scales
ATTORNEYS.

Dec. 1, 1964   R. J. FIBIKAR ETAL   3,159,059
FULLY AUTOMATIC SINGLE STATION BALANCING MACHINE
Filed June 13, 1955   15 Sheets-Sheet 3

*INVENTORS:*
Werner I. Senger
Robert J. Fibikar
BY
*ATTORNEYS.*

Dec. 1, 1964   R. J. FIBIKAR ETAL   3,159,059
FULLY AUTOMATIC SINGLE STATION BALANCING MACHINE
Filed June 13, 1955   15 Sheets-Sheet 5

INVENTORS:
Werner I. Senger
Robert J. Fibikar
BY
ATTORNEYS.

Dec. 1, 1964   R. J. FIBIKAR ETAL   3,159,059
FULLY AUTOMATIC SINGLE STATION BALANCING MACHINE
Filed June 13, 1955   15 Sheets-Sheet 6
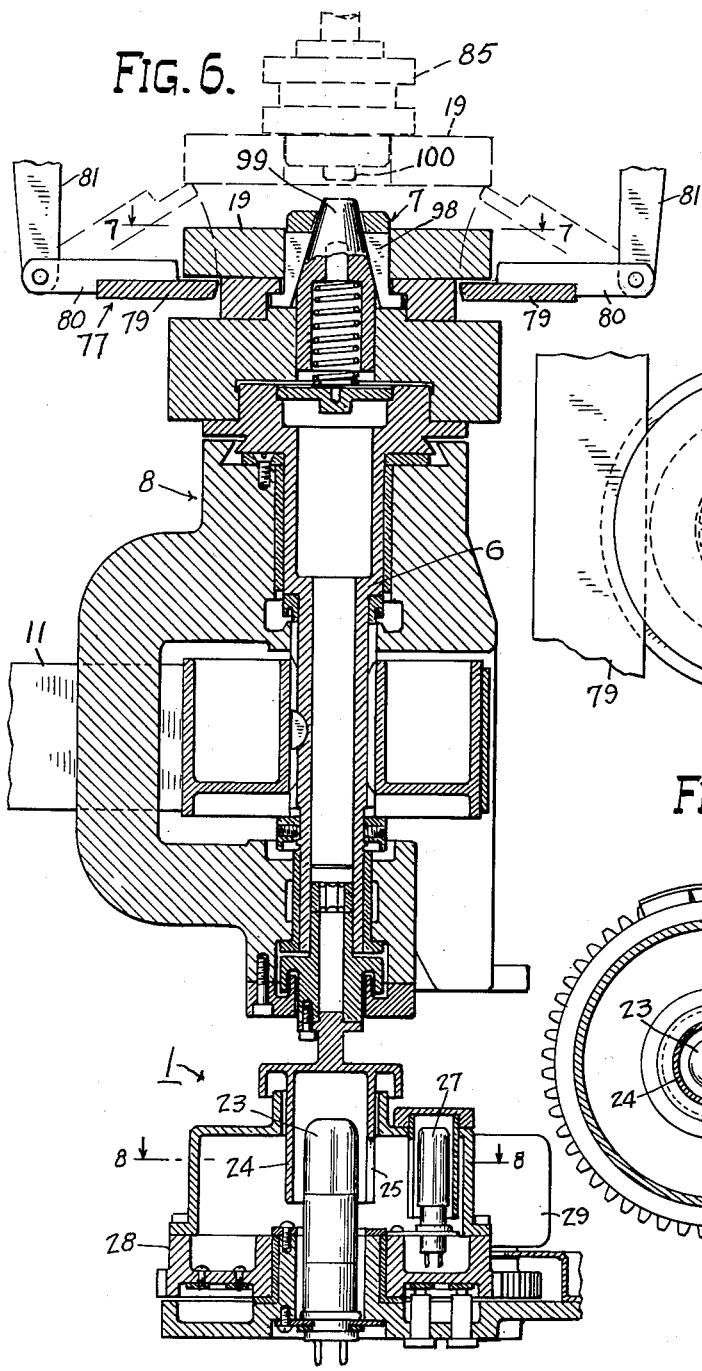
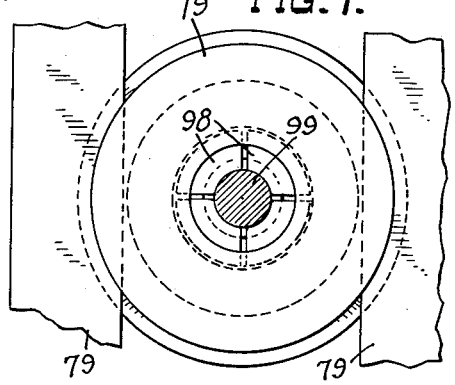
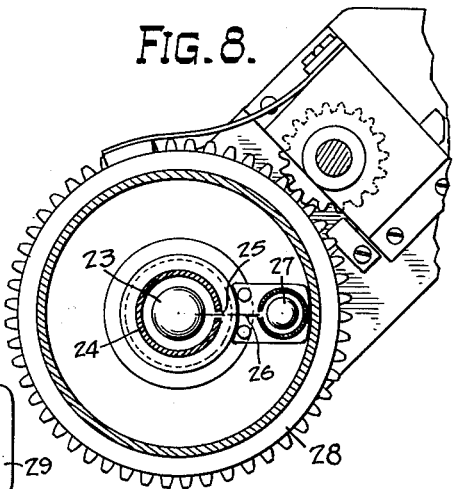
INVENTORS:
Werner I. Senger
Robert J. Fibikar
BY Andrus & Sceales
ATTORNEYS.

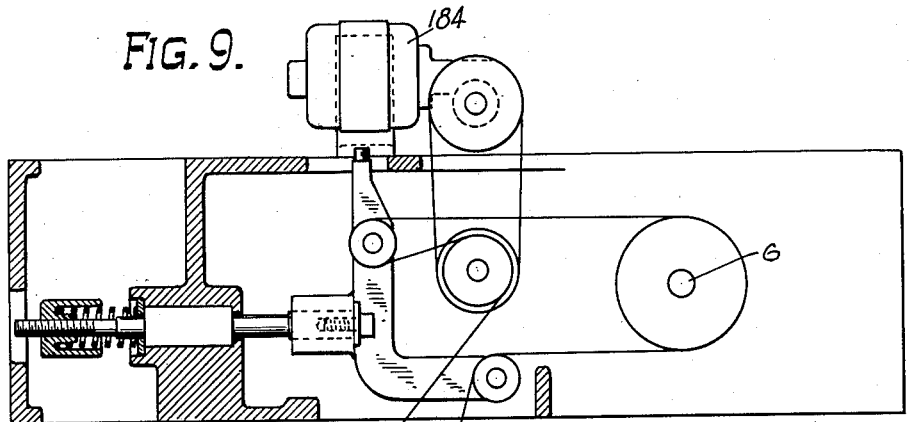
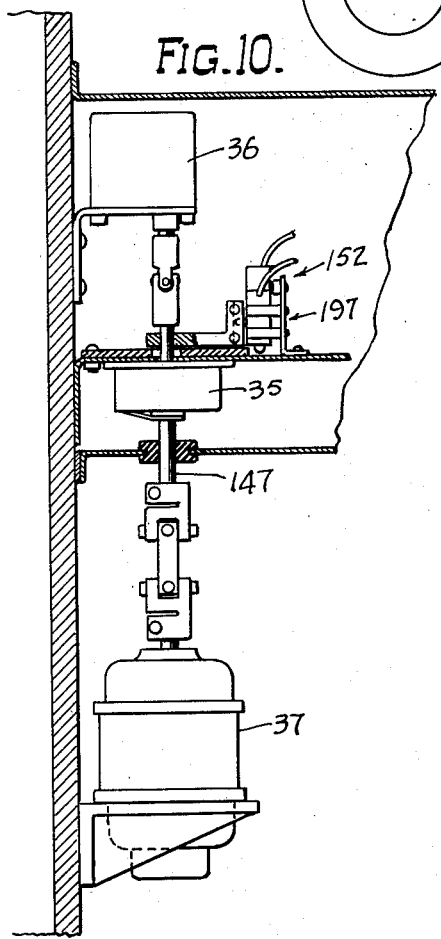
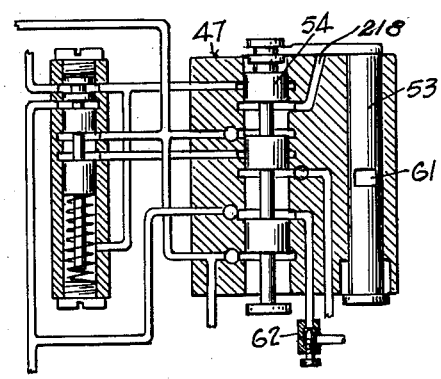
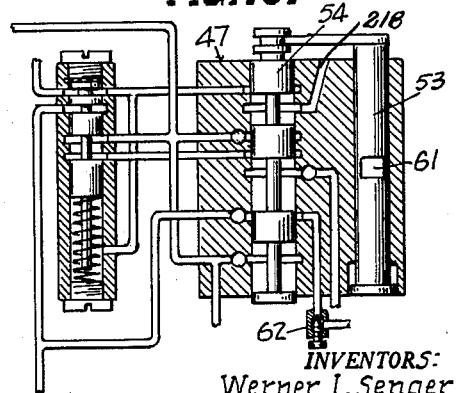

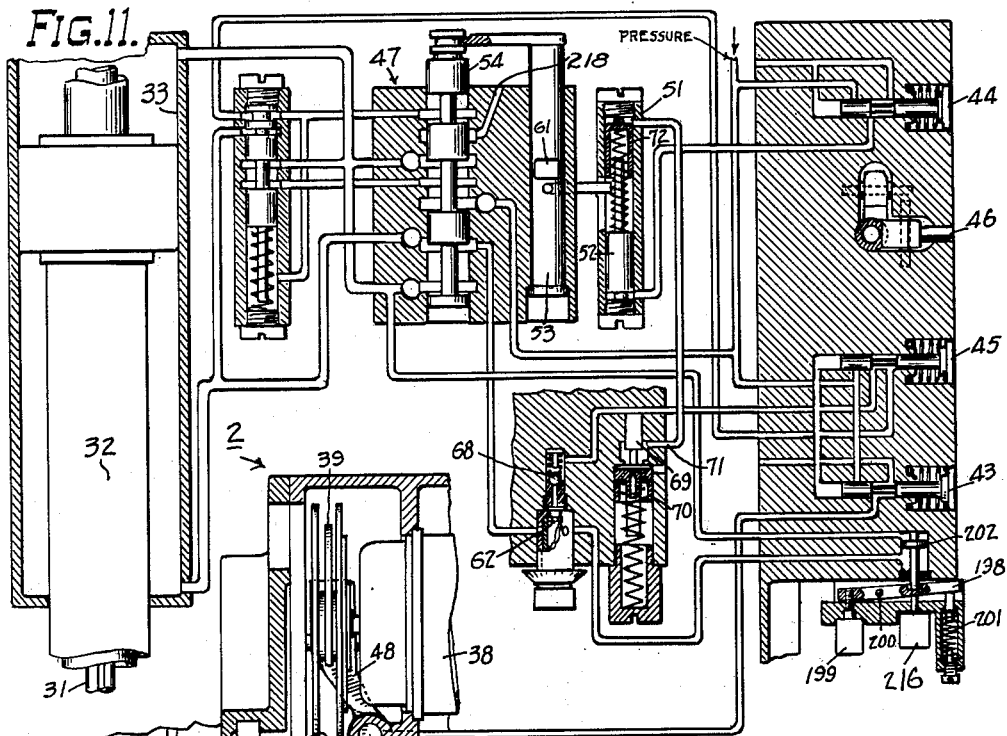

Dec. 1, 1964  R. J. FIBIKAR ETAL  3,159,059
FULLY AUTOMATIC SINGLE STATION BALANCING MACHINE
Filed June 13, 1955  15 Sheets-Sheet 9

INVENTORS:
Werner I. Senger
Robert J. Fibikar
BY
ATTORNEYS.

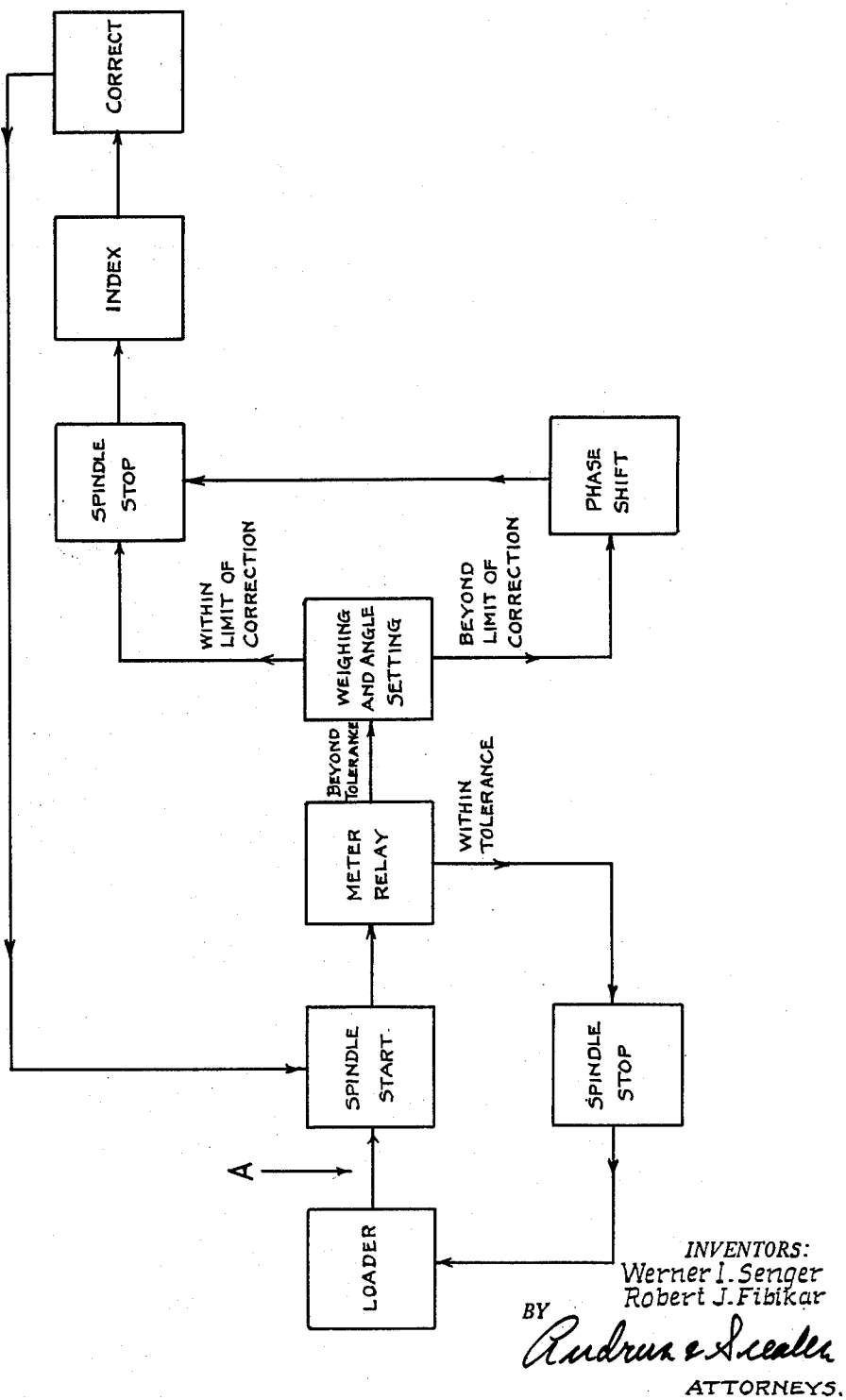

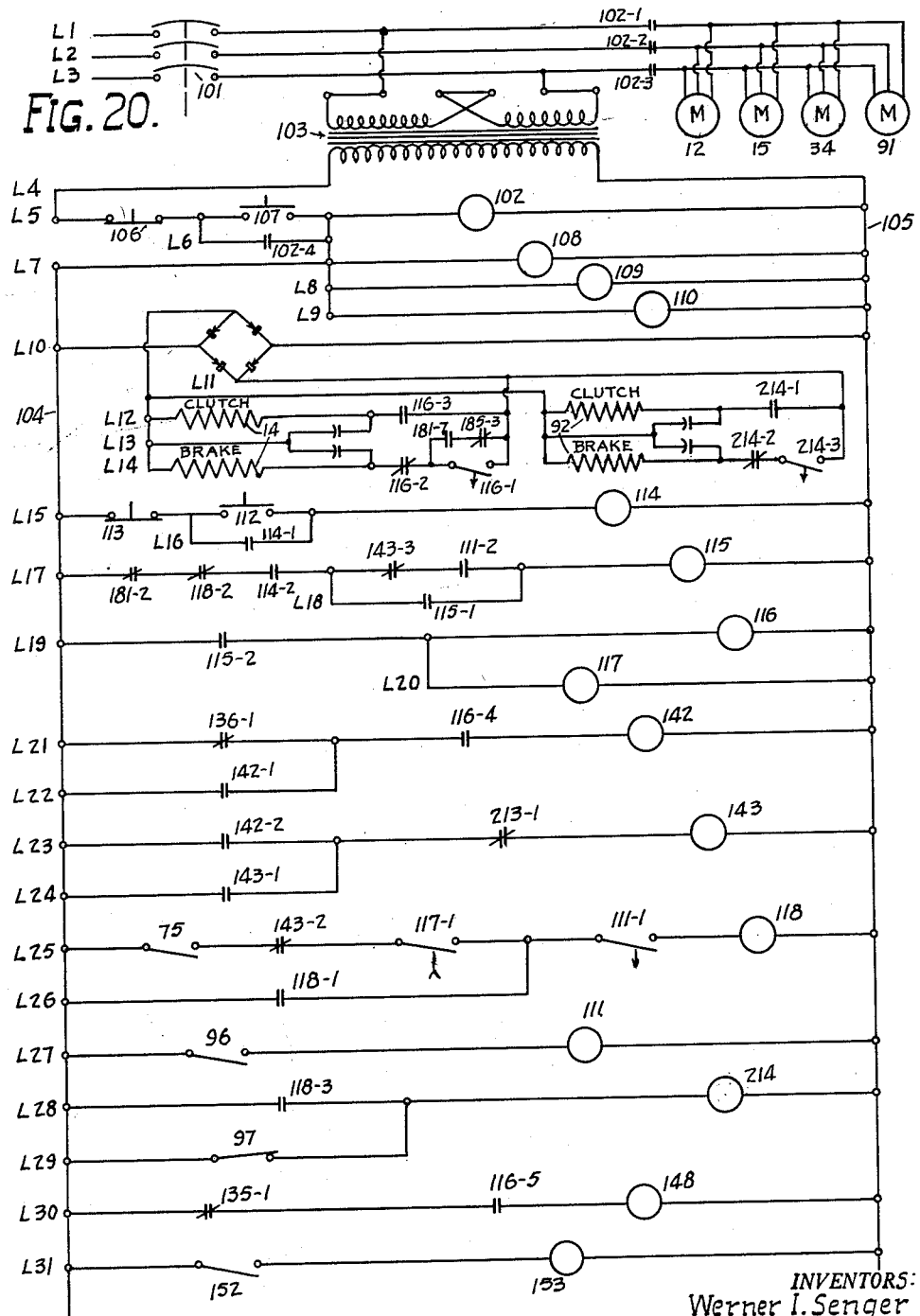

Dec. 1, 1964  R. J. FIBIKAR ETAL  3,159,059
FULLY AUTOMATIC SINGLE STATION BALANCING MACHINE
Filed June 13, 1955  15 Sheets—Sheet 13

INVENTORS:
Werner I. Senger
Robert J. Fibikar
BY
Andrus & Sceales
ATTORNEYS.

INVENTORS:
Werner I. Senger
Robert J. Fibikar
BY
ATTORNEYS.

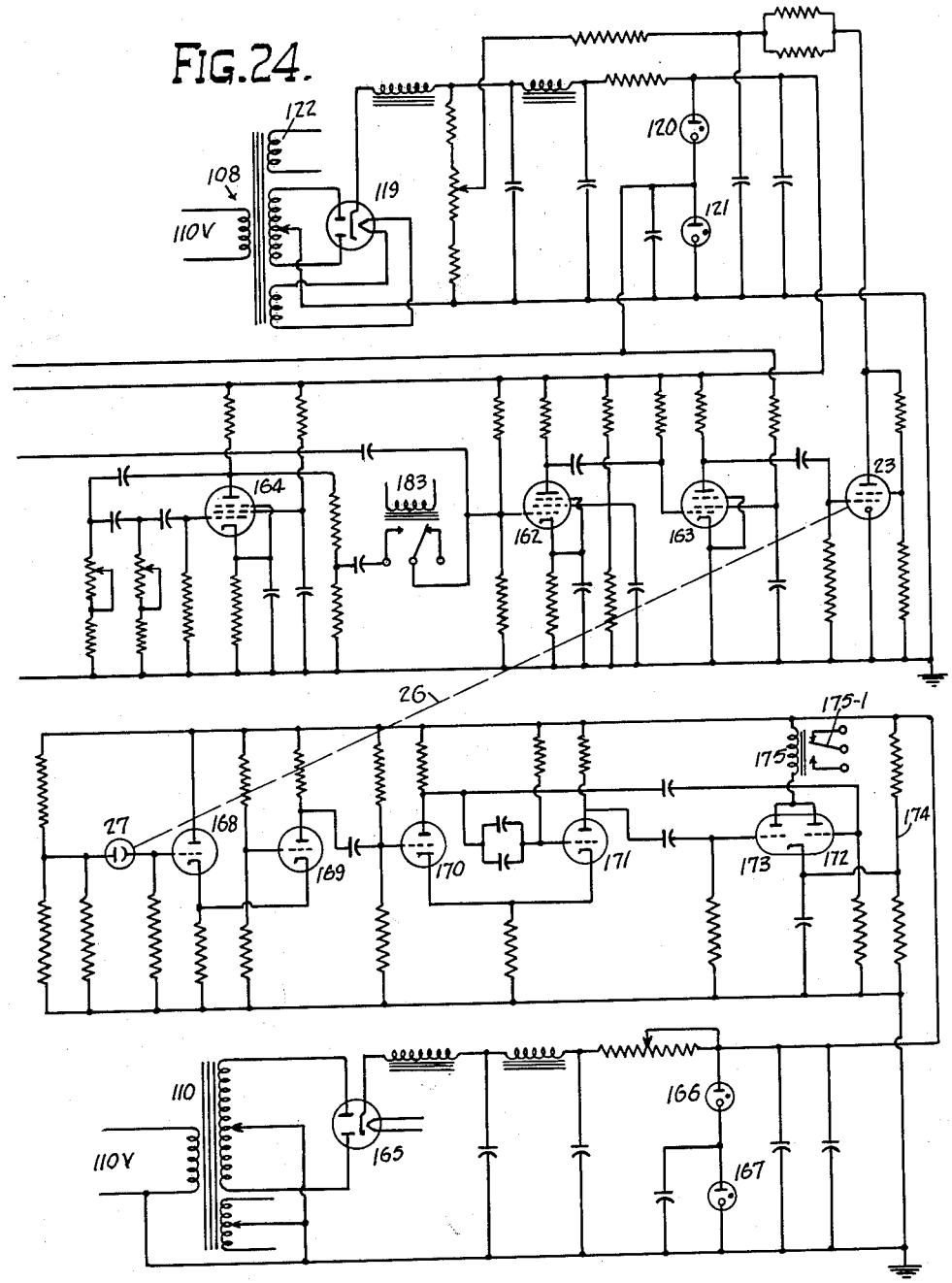

3,159,059
FULLY AUTOMATIC SINGLE STATION BALANCING MACHINE
Robert J. Fibikar and Werner I. Senger, Madison, Wis., assignors to Gisholt Machine Company, Madison, Wis., a corporation of Wisconsin
Filed June 13, 1955, Ser. No. 514,985
18 Claims. (Cl. 77—5)

This invention relates to a fully automatic single station balancing machine wherein the unbalance of successive rotary workpieces is first measured and then corrected without the attention of an operator.

Semi-automatic machines of the multi-station type have been constructed as illustrated in U.S. Patent No. 2,243,379, granted to George H. Johnson on May 27, 1941. Such machines have been generally expensive and could only be economic in mass production operations in balancing complicated structures such as automotive engine crank shafts and the like. Operator attention has been required for operation of these semi-automatic machines. For instance, in the construction illustrated in the Johnson patent the operator had to manually adjust a series of potentiometers in determining the amount of unbalance. A manual angle adjustment of the workpiece has also been required.

It has not been considered practical heretofore to provide a fully automatic machine wherein both unbalance measurement and correction are effected at a single station and without manual attention.

In carrying out the present invention the amount and angle of unbalance are determined automatically and the correction mechanism is automatically set to correspond thereto so that all operations can be made to function step by step in predetermined sequence for each given workpiece. With such a fully automatic machine the successive like workpieces can be fed to and removed from the machine automatically, which requires only the manual pushing of the start button at the beginning of a work period and the stop button at the end of the period.

The invention utilizes certain of the principles of the Johnson patent referred to above, particularly with reference to transfer of unbalance amount intelligence. It utilizes the principles of the copending application of W. I. Senger, Serial No. 468,397, filed November 12, 1954, and now Patent No. 2,944,424, with respect to automatic determination of the angle of unbalance. It also utilizes the principles of tolerance limit balance testing described and claimed in the copending application of W. I. Senger, Serial No. 471,627, filed November 29, 1954, and now abandoned for Unbalance Inspecting Machine.

The invention is illustrated as applied to a vertical axis machine, but it may be similarly applied to a horizontal axis machine.

The accompanying drawings illustrate the invention as applied to a machine adapted to balance simple rotary parts such as hydraulic transmission rotor shells and the like, and the embodiment illustrated constitutes the best mode presently contemplated of carrying out the invention.

In the drawings:

FIG. 6 is an axial section taken through the spindle on line 6—6 of FIG. 4 and showing the adapter on the upper end and the angle determining device on the lower end;

FIG. 7 is a transverse horizontal section taken on line 7—7 of FIG. 6 showing the work gripping mechanism of the adapter;

FIG. 8 is a transverse horizontal section taken on line 8—8 of FIG. 6 showing the lamp and photoelectric cell used for angle determination;

FIG. 9 is a detail layout with parts in section and showing the belt drive for the spindle and of the workpiece index drive therefor;

FIG. 10 is a detail layout with parts in section and showing the apparatus for weighing the amount of unbalance;

FIG. 11 is a section showing the hydraulic feed for the correction drill with a layout of the hydraulic control circuit therefor;

FIGS. 14, 15 and 16 are detail schematic showings of the successive valve positions in controlling the drill feed and traverse;

FIG. 19 is a block diagram of the cycle of the machine;

FIG. 20 is a portion of the control circuit showing the spindle motor and correction drill motor;

FIG. 24 is a wiring diagram showing the D.C. rectifier source for vacuum tube plate currents, apart of the network for the stroboscope flash extended from the right of the amplifier circuit of FIG. 23, and the photo-cell amplifier control circuit.

Figure 1:
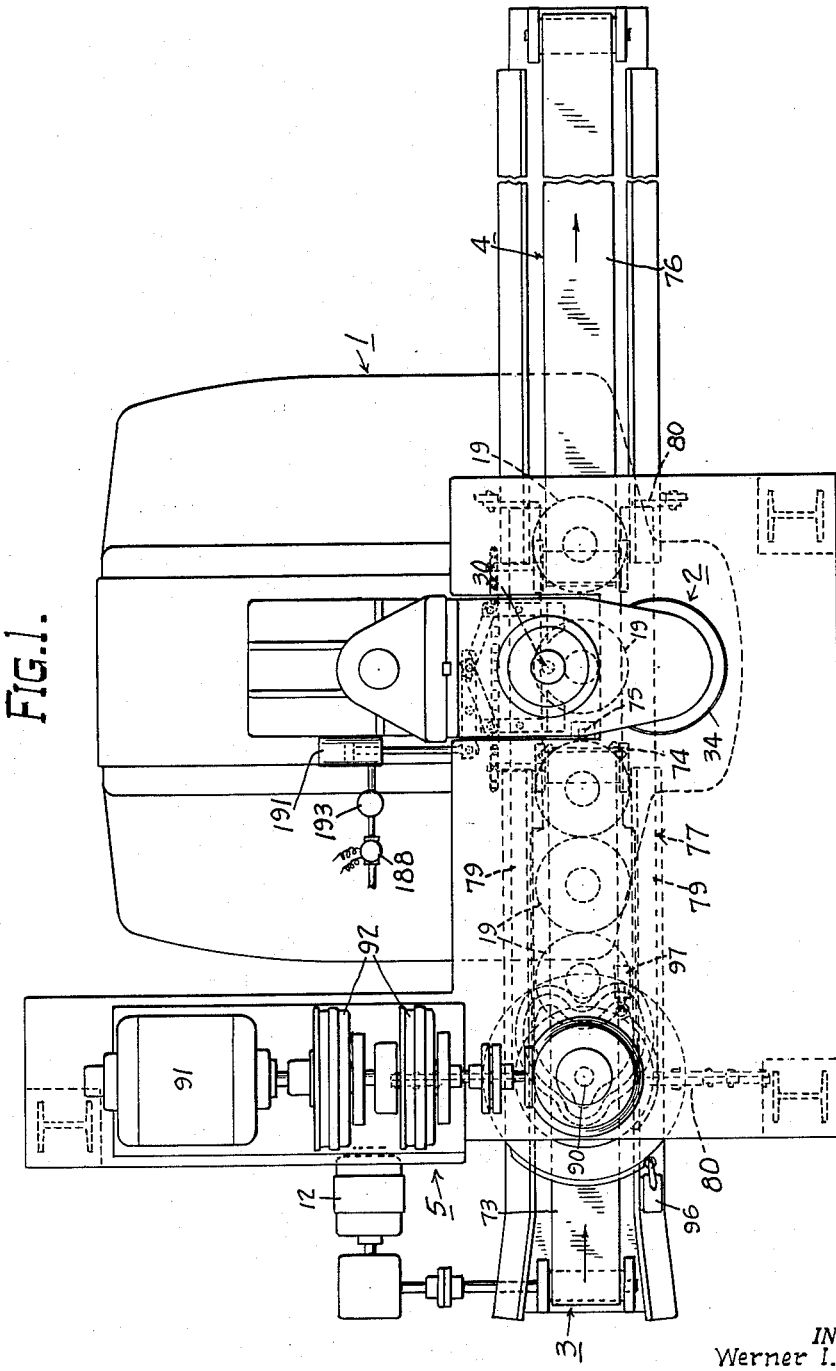
FIGURE 1 is a top plan view of the machine showing the conveyor system therewith.

Referring to FIG. 19, the machine is constructed to provide the sequential operations there depicted in blocks. When the start button is pushed the loader picks up a blank from the incoming conveyor and deposits it on the spindle of the balancer where it is received and held by the adapter. When the loader returns to its starting position the adapter clamps the work blank and the spindle is started to rotate.

The out of balance of the blank is measured by the meter relay and if the blank is within a predetermined tolerance for out of balance the meter relay fails to trip within a given time and thereupon the spindle is stopped and the adapter is unclamped and the loader is actuated to remove the blank from the machine and to insert the next blank for testing.

If the blank exceeds the tolerance limit for unbalance the meter relay is tripped and the correction cycle started by weighing the unbalance and determining the angle of unbalance. During weighing or measuring the amount of unbalance the correction apparatus is set to limit the correction to that necessary to correct the amount of unbalance.

Upon completion of weighing and angle determination the spindle is stopped and then indexed to locate the blank angularly relative to the correction apparatus so that correction is made in the right place. Correction is thereupon made. Where the amount of unbalance is beyond the capacity of the correction apparatus to correct in a single operation the weighing apparatus effects a phase shift in the angle setting before the spindle is stopped, so that the correction is made at a predetermined angle from the angle of unbalance.

Following correction the cycle returns to the first spindle start position whereby the blank is rotated a second time and its unbalance determined. If its unbalance has been corrected adequately it will be within the tolerance limit and will fail to trip the meter relay, so that it will be removed from the machine without entering a further correction cycle. If its unbalance still exceeds the tolerance as where the phase shift had offffset the correction angle, the meter relay will trip and start another correction cycle, following which it will again be subjected to unbalance tolerance test and then removed from the machine.

The above operations are carried out fully automatically in the machine of the present invention.

The machine illustrated comprises a balance measuring apparatus 1, a balance correcting apparatus 2, an incoming conveyor 3, an outgoing conveyor 4, and a loader 5.

The balance measuring apparatus 1 comprises, in general, a vertical rotary spindle 6 having a suitable work gripper adapter 7 at its upper end.

The spindle 6 is mounted in suitable bearings on a cradle 8 suspended for free lateral vibratory motion in a given plane by means of suspension strips 9 from frame 10.

The spindle 6 is driven by a belt 11 from a drive pulley on the output shaft 13 of an electric clutch and brake mechanism 14 which connects and disconnects the same to the drive motor 15.

The upper end of cradle 8 has a rod 16 extending horizontally therefrom in the plane of the lateral vibrations previously referred to, and which rod carries an electromagnetic coil 17 at its end disposed in the space between the opposite poles of a permanent magnet 18 so that as the work-piece 19 on the spindle 6 is rotated with the spindle and effects an unbalance vibration moving rod 16 longitudinally, the turns of coil 17 cut magnetic lines of force and thereby a series of electrical voltage impulses are generated in the coil. The coil 17 is connected to the input of a suitable amplifier 20 and the amplified impulses are then passed through a suitable network 21, and also to a voltmeter relay 22 which indicates the magnitude or amount of unbalance in the workpiece 19.

The network 21 supplies flashing impulses to a stroboscope lamp 23 disposed axially of spindle 6 at the lower end thereof, each flashing of the lamp corresponding to a predetermined part of the vibration cycle for the workpiece so that from the flash the angular location of the unbalance in the workpiece can be determined. For this latter purpose a suitable shield, shown as a cylindrical cup 24, is secured to the lower end of spindle 6 to rotate therewith and surrounds the lamp 23. The shield 24 has an opening or slot 25 in one side to permit the transmission of a radial beam 26 of light each time the lamp 23 flashes (see FIG. 8).

A photoelectric cell 27 is mounted on a rotatable carriage 28 as described in the copending application of W. I. Senger, one of the present inventors, Serial No. 468,397, filed November 12, 1954, and now Patent No. 2,944,424, for Stroboscopic Determination of Angle of Unbalance in Rotary Workpieces.

Carriage 28 is rotated slowly by an electric motor 29 until the photoelectric cell 27 reaches a position where light beam 26 will enter the same. Thereupon the current passing through the photoelectric cell 27 is amplified and utilized to stop motor 29 and carriage 28 at the position indicative of the angular location of unbalance in the workpiece as related to the plane of vibration. After the spindle 6 and workpiece 19 are stopped, they may be indexed angularly relative to the correction apparatus as hereinafter described.

The balance correcting apparatus 2 may comprise any one of the known correcting means such as drilling, grinding, solder applying, and slug cutting and welding mechanism. For simplicity the balance correcting apparatus 2 here illustrated comprises a single rotary drill 30 carried by the vertical shaft 31 above the adapter 7. The drill shaft 31 is made extensible by a spline connection between an upper and a lower part of the shaft. The lower part of shaft 31 is carried in suitable bearings in a piston to constitute a ram 32 operated hydraulically within the power cylinder 33. The drill motor 34 is carried by the outer housing and connected to drive the upper part of the drill shaft 31 to drive the same preferably constantly during operation of the machine.

The drill 30 is actuated to remove a measured quantity of metal from the work blank at a predetermined radius from the rotational center of the blank to correct for unbalance. In doing this, means are provided for setting the depth of the drill cut to correspond with the desired amount of metal to be removed after taking into account the radial position of the cut, the angle of the cut relative to the axis of the work blank, the size of the drill, the shape of the drill points, the angle of drill entry (if not 90° to the blank surface), and the weight of the material of the blank. These several factors are compensated for in the construction of a depth cam which is used in setting for drill depth for each individual work blank, as referred to in the Johnson Patent No. 2,243,-379, referred to above.

The detail mechanism for controlling the drill depth is shown in FIGS. 10 to 16, 22 and 23. It comprises a straight line potentiometer 35 connected to feed a bucking D.C. potential against the output potential of the unbalance pulses from amplifier 20.

Potentiometer 35 is actuated by a motor 36 which in turn is started by tripping of the meter relay 22 referred to previously and is stopped when the bucking voltage equals the measured voltage indicating amount of unbalance. Motor 36 also actuates a selsyn generator 37 which in turn drives a selsyn motor 38 in exact accordance therewith. The specially designed depth cam 39 is mounted on the shaft of motor 38 or otherwise driven thereby.

Prior to actuation of ram 32 a stop plunger 40 is hydraulically moved upwardly of the ram to a setting determined by the cam 39 to position the stop plunger a distance from a limit switch actuating lever corresponding to the depth of drilling to be accomplished. Then as ram 32 moves downwardly in fast forward traverse and in feed, and as it touches the work and builds a slight increase in back pressure in the hydraulic system, a clamp 41 is actuated to secure stop plunger 40 to a part of the ram so that from the time the drill engages the work the stop plunger 40 will travel with it toward the actuating lever of limit switch 42. When plunger 40 actuates limit switch 42 the drill feed is stopped and the ram 32 is reversed.

The ram 32 may be driven by any suitable means: mechanical, electrical or hydraulic. The power cylinder 33 illustrated for this purpose may be actuated and controlled by any suitable solenoid valve system. The system illustrated employs three normally closed solenoid valves 43, 44 and 45, respectively, a solenoid plunger 46 and a spool valve 47.

Actuation of solenoid valve 43 admits pressure fluid to the actuating cylinder of brake 48 for securing cam 39 in adjusted position just prior to a correction operation, and also admits pressure fluid to a cylinder 49 which moves plunger 50 to abut the cam 39 and set the position for stop plunger 40.

Actuation of solenoid valve 44 admits pressure fluid to a cylinder 51, the piston 52 of which moves a rod 53 that in turn actuates the spool 54 of valve 47 to the position shown in FIG. 11 where valve 47 admits pressure fluid directly to both ends of power cylinder 33. The piston ram 32 in cylinder 33 has such a large diameter relative to the diameter of the cylinder that the pressure fluid in the upper end of the cylinder is applied over a much larger piston area than that in the lower end of the cylinder, thereby effecting a fast downward traverse for the ram when pressure fluid is admitted to both ends of the cylinder as described.

As ram 32 moves rapidly downward and the tip of drill 30 approaches close to the work a shift block 55 is moved a predetermined distance therewith by the friction block 56 normally clamped on a rod 57 parallel to and carried by the ram. A stop 58 releases the clamp and provides for free continued movement of the rod 57 through the block 56 during drilling of blank 19.

Shift block 55 has a circular opening therein that receives a roller 59 carried on the free end of a bell crank lever 60, the opposite end of the lever engaging a notch 61 in the side of rod 53. When shift block 55 moves downwardly as described above, the rod 53 is shifted to move the spool 54 to a position in valve 47, corresponding to that shown in FIG. 14, and where pressure fluid is more slowly admitted only to the top of cylinder 33 and fluid is drained from the lower end of the cylinder through a feed control adjustable aperture valve 62, normally open valve 45, valve 47 and passage 218.

Upon reverse of the ram 32, rod 57 picks up the friction block 56 and carries it upwardly. An adjustable stop 63 locates the friction block 56 a predetermined distance from the shift block 55 corresponding to the length of travel of the ram in fast forward traverse.

The shift block 55 is raised to its upper position as ram 32 reaches its uppermost position, by an adjustable screw abutment 64 which engages a plunger 65 that shifts the block. Shifting of block 55 upwardly as described, actuates bell crank 60 and rod 53 to move spool 54 to a position in valve 47 wherein the pressure fluid does not enter power cylinder 33 and the valve is said to be in neutral position, as in FIG. 16.

Figures 12, 13:
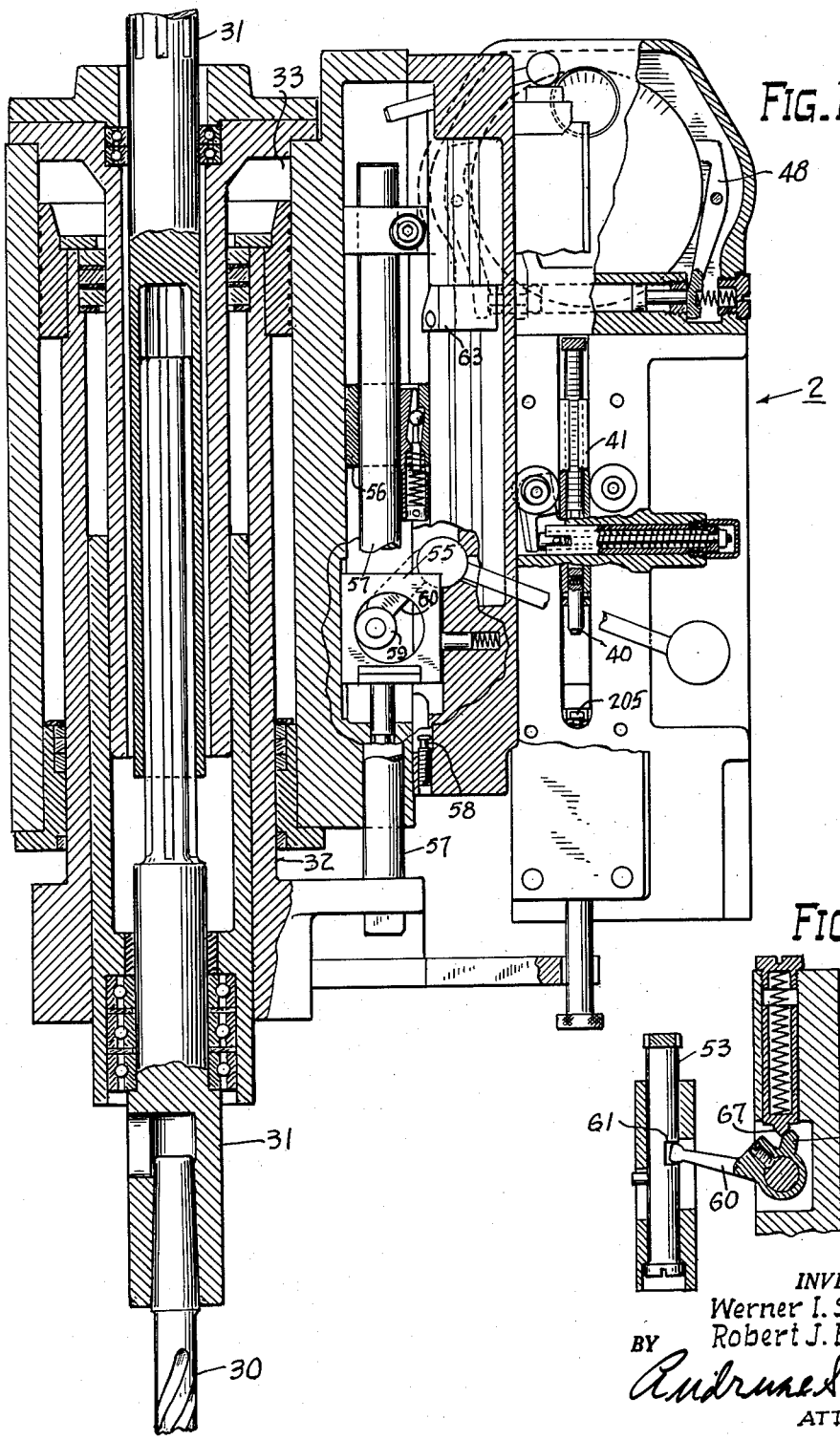
FIG. 12 is a detail view showing the drill feed mechanism at right angles to the detail shown in FIG. 11.
FIG. 13 is a detail of the forward and reverse shift mechanism for the drill.

The bell crank lever 60 as shown in FIG. 13 has a wedge shaped arm 66 which faces and is engaged by a corresponding spring biased wedge shaped plunger 67. The construction and relative positioning of arm 66 and plunger 67 are such that they provide only two positions for bell crank lever 60, i.e., forward fast traverse and reverse of back fast traverse. Shifting of block 55 downwardly to effect feed of the ram following forward traverse holds the arm 66 and plunger 67 at approximately dead center position. Likewise shifting of block 55 upwardly to effect a neutral position for valve spool 54 as shown in FIG. 16, following back traverse of the ram holds the arm 66 and plunger 67 at approximately dead center position.

Actuation of solenoid valve 45 admits pressure fluid to the back side of the ball check valve 68 in the feed control aperture valve 62, thereby stopping further drain of fluid from the lower end of cylinder 33 and stopping the feed of ram 32. Solenoid valve 45 also admits pressure fluid to a dwell timing piston 69 which is actuated slowly due to dash pot resistance 70 until it uncovers a passage 71 which conducts the pressure fluid to the opposite end of cylinder 51 to actuate a piston 72 which moves rod 53 and thereby spool 54 to a position as shown in FIG. 15, where the pressure fluid is admitted only to the lower end of cylinder 33 and fluid is drained from the upper end of the cylinder to back traverse the ram 32.

The incoming conveyor 3 may be of any suitable construction, that shown constituting an endless belt 73 with fixed stops 74 at the end for locating the incoming workpiece for pick up by the loader 5. A limit switch 75 is adapted to be closed by the workpiece as it approaches the stops 74.

Similarly, the outgoing conveyor 4 is illustrated as a simple endless belt 76 suitably mounted and driven to carry workpieces deposited thereon by loader 5 from the machine. The motor 12 drives both belts 73 and 76 continuously.

The loader 5 comprises a lifter mechanism 77 and a pusher mechanism 78.

The lifter mechanism 77 comprises a pair of laterally spaced side bars 79 each carried at the inner ends of a pair of pivotal arms 80. The arms 80 are pivoted on brackets 81 suspended from colums 82 which contain actuating mechanism connected by links 83 to the outer ends of the corresponding arms.

The pusher mechanism 78 comprises a slide 84 disposed above and across the top of spindle 6 and carrying a pair of workpiece locaters 85 which serve to push the workpieces along the side bars 79 when the latter have lifted the workpieces. Locaters 85 are adapted to be lowered and raised at the ends of the stroke of slide 84 and for this purpose a cam slide 86 is adapted to control the vertical movement of the locaters.

The pivotal arms 80, slide 84 and cam slide 86 are actuated in correlation by a set of rotary cams 87, 88 and 89, respectively, on a vertical shaft 90 driven by motor 91 through suitable electric clutch and brake mechanism 92. In actuating arms 80 the cam 87 operates push rods 93 connected to the actuating mechanism for links 83.

Additional cams 94 and 95 on shaft 90 serve to trip limit switches 96 and 97, respectively, to be described hereinafter.

The adapter 7 comprises an expanding head composed of four quadrants 98 carried on a spring supported cone 99 and which are adapted to enter a central opening in the workpiece 19 to center and grip the latter. The workpiece 19 is released from the adapter 7 by means of a central pin 100 extending from each locater 85 to push the cone 99 downwardly and permit radial inward movement of the quadrants 98.

Figure 21:
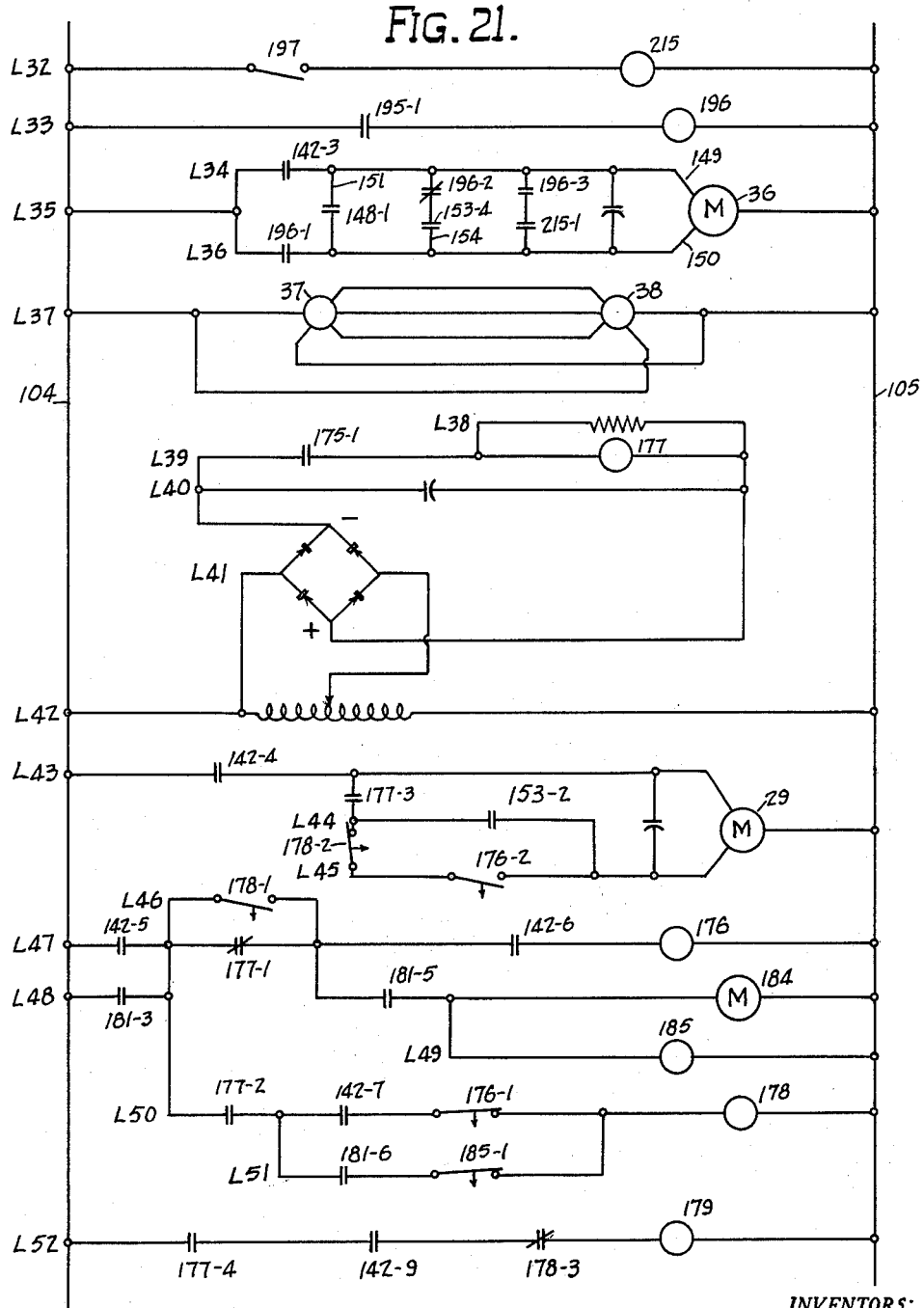
FIG. 21 is the adjacent middle portion of the control circuit extended downwardly from FIG. 20.
Figure 22:
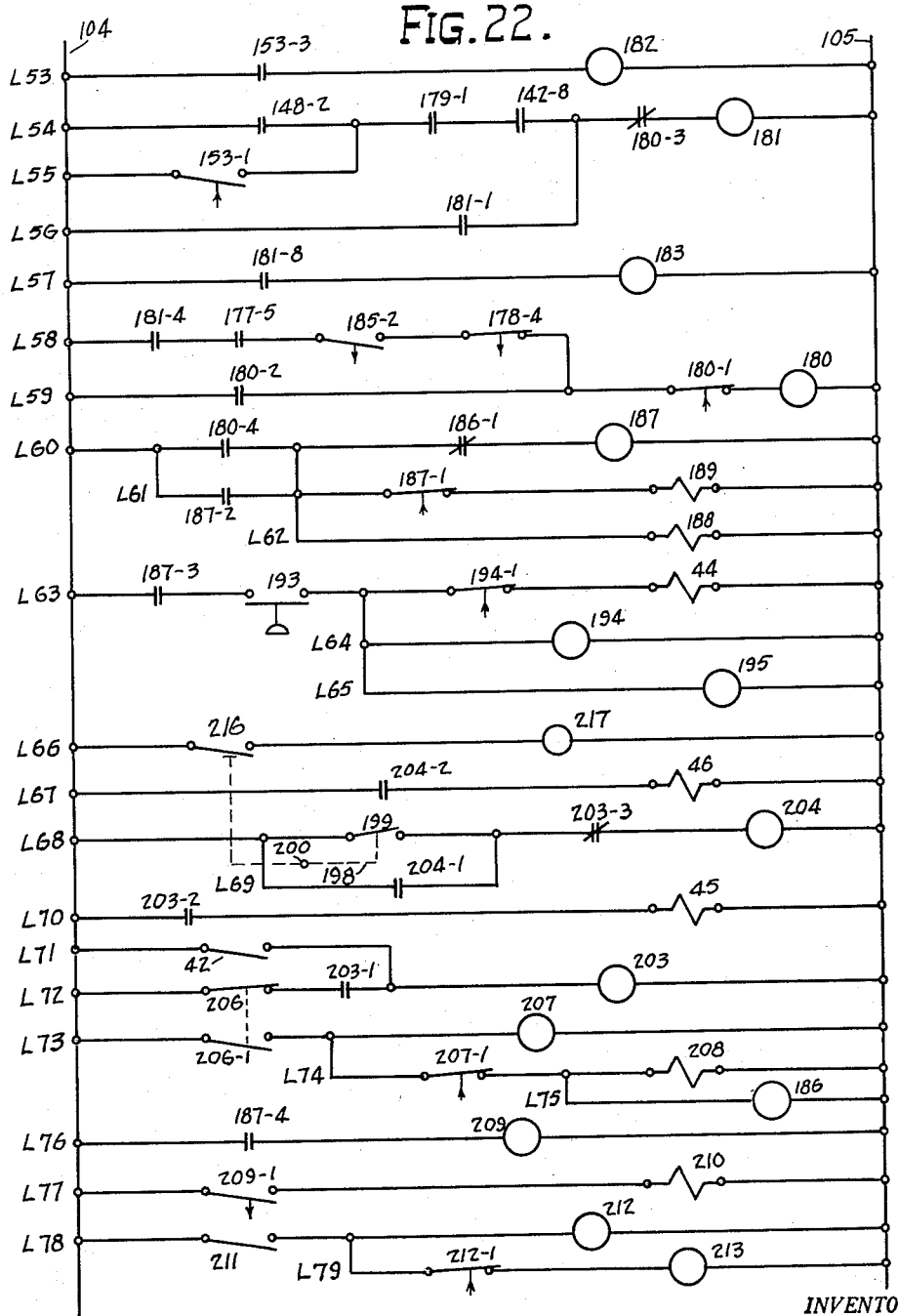
FIG. 22 is the adjacent lower end portion of the control circuit extended downwardly from FIG. 21.

The operation of the machine will be described generally in connection with the control circuits illustrated in FIGS. 20-24. In the drawings of FIGS. 20-22 the lines containing the several control elements referred to are separately numbered with an "L" preceding the number to indicate that it is a line number.

Referring first to the main control diagram of FIGS. 20 to 22, the three phase power lines L1, L2 and L3 are connected by the usual circuit breaker 101 and the starter contractors 102-1, 102-2 and 102-3, respectively, to drive the conveyor motor 12, the spindle drive motor 15, the drill motor 34 and the loader motor 91, continuously. The starter contactors 102-1, 102-2 and 102-3 are normally open and are closed by the starter relay coil 102 connected in line L5.

Line L4 constitutes a transformer 103 powered from lines L1 and L3 through circuit breaker 101. The secondary of the transformer 103 feeds 110 volt alternating current to two vertical leads 104 and 105 between which the various control elements are connected by numbered lines.

The normally closed stop button switch 106 and the normally open start button switch 107 are connected in series in line L5 with the relay coil 102. A holding circuit bypasses start button switch 107 and is closed by the normally open contacts 102-4 in line L6 upon energization of relay coil 102 by the manual pressing of the start button switch.

Figure 23:
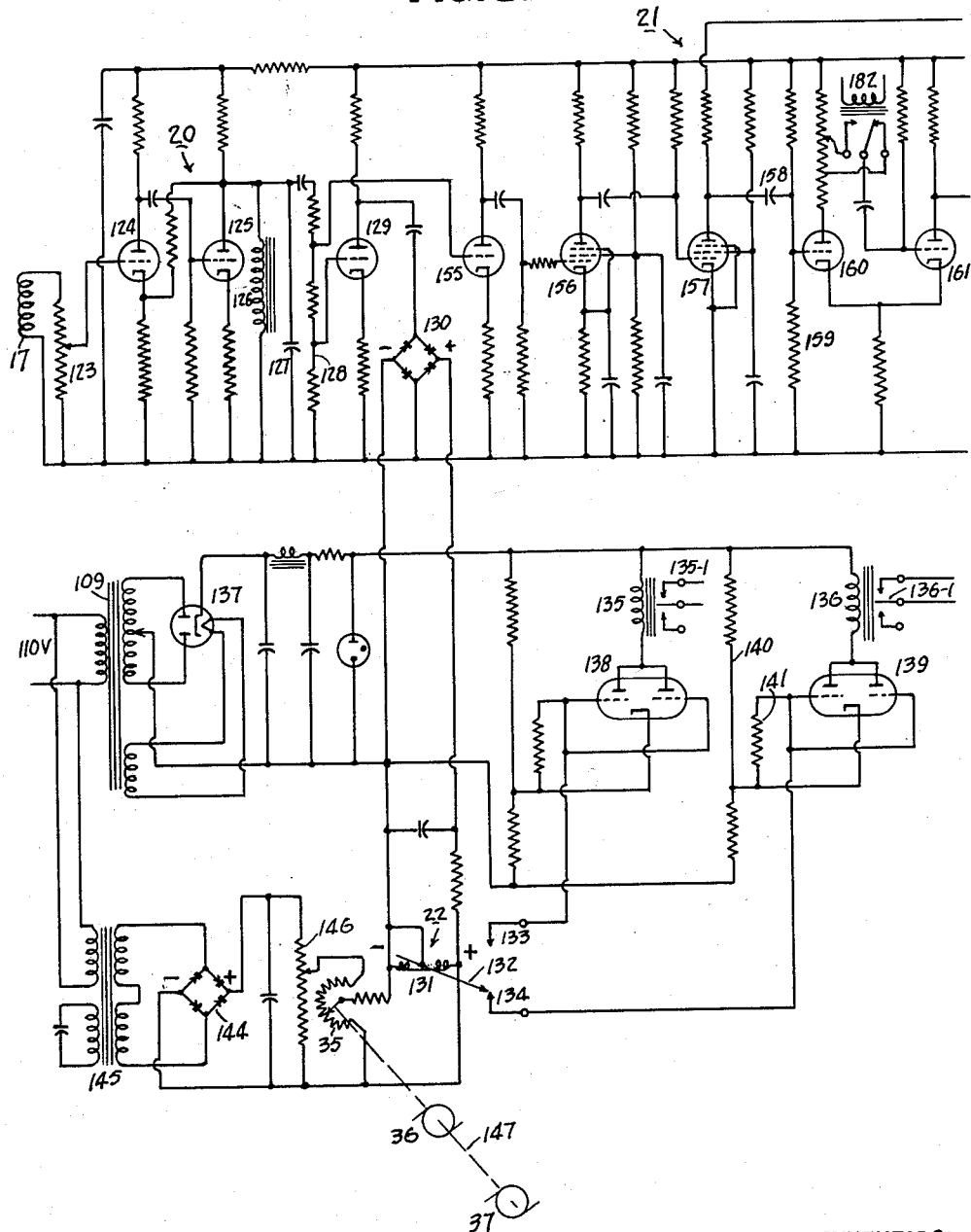
FIG. 23 is a wiring diagram showing the pick-up amplifier circuit portion and also showing the weighing circuit.

Lines L7, L8 and L9 contain the input primaries for the transformers 108, 109 and 110 supplying power to the amplifying and network system shown in FIGS. 23 and 24. These transformers 108, 109 and 110, and also drive motors 12, 15, 34 and 91 are continuously energized upon closing of the circuit breaker 101 and pressing of the start button switch 107, and remain energized until the stop button switch 106 is pressed.

Figure 2:
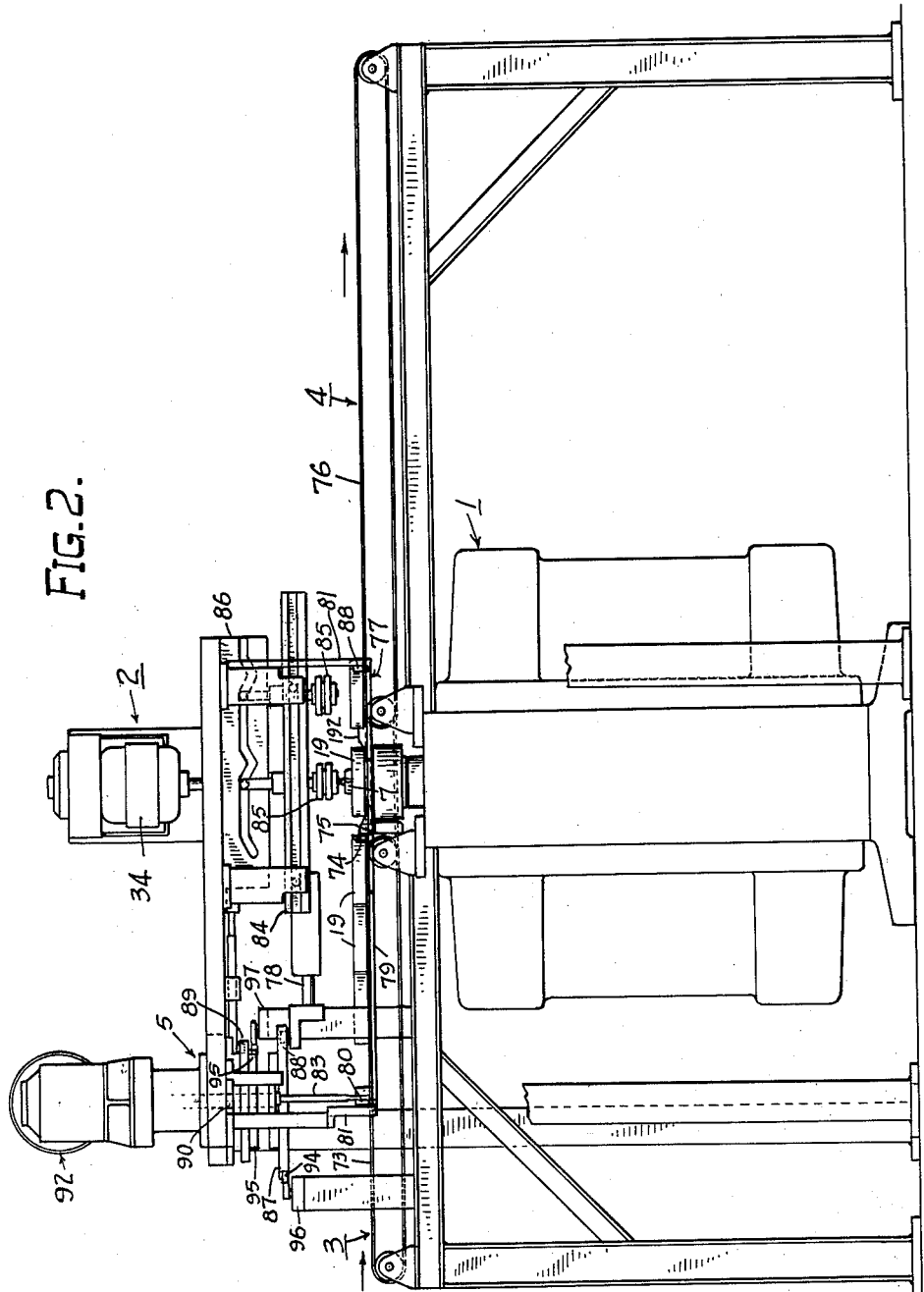
FIG. 2 is a front elevation of the structure of FIG. 1.
Figure 3:
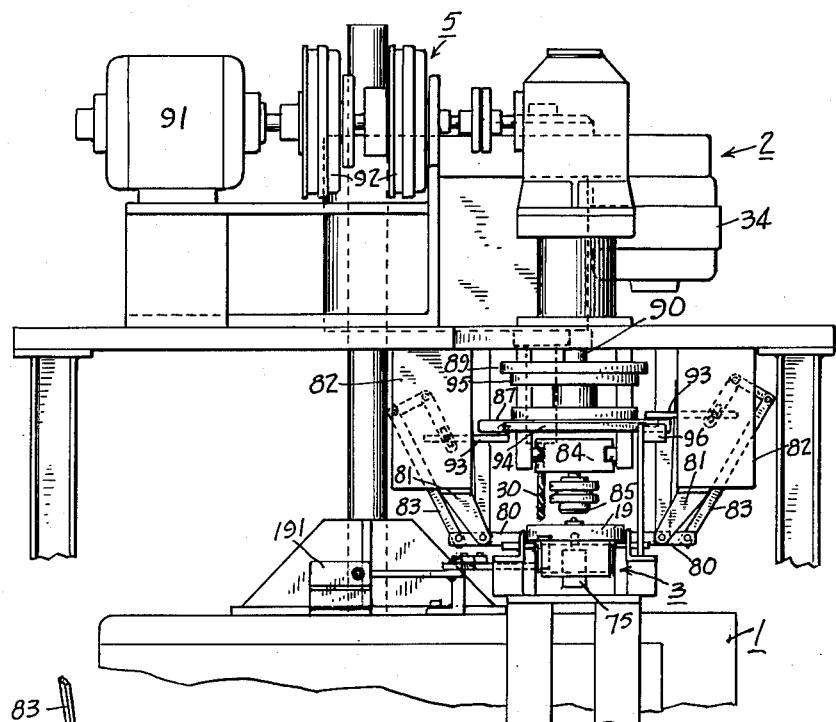
FIG. 3 is a left end elevation of the machine.
Figure 17:
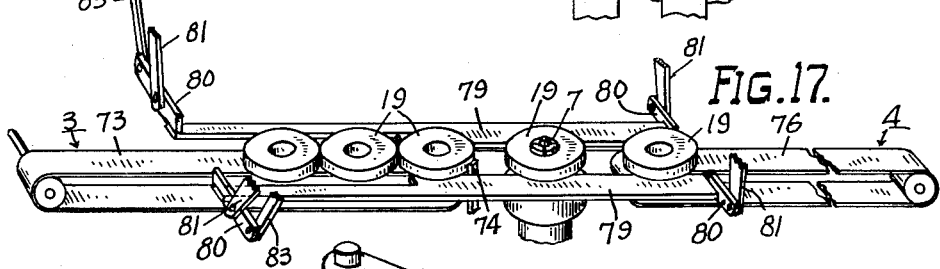
FIG. 17 is a detail perspective of the loader construction.

Assuming that the start button switch 107 has been pressed and that a workpiece 19 is on the end of conveyor 3 ready to be loaded into the machine. Limit switch 75 in line L25 (also see FIG. 2) will be closed by engagement therewith of the workpiece. The loader lifter 77 is at its starting position, wherein limit switch 96 in line L27 is closed, thereby energizing the time delay relay 111 in line L27, and in which limit switch 97 in line L29 is held open. With relay coil 111 energized the contacts 111–1 are closed in line L25, and contacts 111–2 are closed in line L17.

The normally open cycle start button switch 112 is in series with a normally closed cycle stop button switch 113 and relay coil 114 in line L15. Energization of relay coil 114 by closing of the cycle start button switch 112, closes the holding contacts 114–1 in line L16, and which bypasses cycle start button 112 to keep relay coil 114 energized until the cycle stop button 113 is pressed.

Energization of relay coil 114 closes the normally open contacts 114–2 in line L17 which completes the flow of current through closed contacts 111–2 and a relay coil 115 in line L17. Relay coil 115 closes the holding contacts 115–1 in line L18 bypassing contacts 111–2 to keep the relay 115 energized.

Energization of relay coil 115 also closes contacts 115–2 in line L19 which energizes the time delay relays 116 in line L19 and 117 in line L20. Time delay relay 117 closes contacts 117–1 in line L25, thereby completing the circuit through a relay coil 118 in line L25. Relay coil 118 closes holding contacts 118–1 in line L26 bypassing limit switch 75 and contacts 117–1. Relay coil 118 also opens the normally closed contacts 118–2 in line L17 to de-energize relay coil 115 thereupon opening contacts 115–1 and 115–2 and de-energizing time delay relays 116 and 117.

Energization of relay coil 118 also closes contacts 118–3 in line L28 which energizes the time delay relay 214 in line L28 that closes the cltuch contacts 214–1 in line L12 and opens the brake contacts 214–2 in line L14 of the clutch and brake mechanism 92 for the loader motor 91. As loader arms 80 rise to lift workpiece 19 from conveyor 3 limit switch 96 in line L27 opens and de-energizes time delay relay 111 which opens contacts 111–1 and de-energizes relay coil 118 in line L25 at a time after pusher 78 starts moving horizontally and cam 94 has left limit switch 97 in line L29 thereby letting the latter switch contacts close to retain the circuit for the clutch 92 of loader motor 91.

Thereafter the motor 91 continues to drive and cam 88 reciprocates pusher slide 84 forward and back until it completes a cycle and cam 95 again engages limit switch 97 to open it. As the carriage deposits the workpiece 19 upon the adapter 7 the arms 80 lower and cam 94 engages and closes limit switch 96, and cam 95 engages limit switch 97 to actuate relay 214 and de-energize the clutch and energize the brake of mechanism 92, thereby stopping the loader at the starting point for its cycle.

Closing of limit switch 96 energizes time delay relay 111 in line L27 and which in turn closes contacts 111–2 in line L17 and under predetermined time control closes contacts 111–1 in line L25. The first contacts 111–2 complete the circuit through relay coil 115 in line L17. Contacts 115–1 in line L18 are closed to hold the circuit for relay coil 115.

Energization of relay coil 115 closes contacts 115–2 in line L19 thereby energizing time delay relay 116 which closes contacts 116–3 in line L12 to energize the clutch of mechanism 14 which serves to drive spindle 6 from motor 15. As the spindle 6 carrying the adapter 7 and workpiece 19 reaches the operating rotational speed the unbalance of the workpiece vibrates cradle 8 thereby moving coil 17 in the field of magnet 18.

The potential thus created in the form of voltage impulses is transmitted to amplifier 20 and from there to the voltmeter relay 22 as previously stated.

For this purpose transformer 108 FIG. 24, feeds a rectifier tube 119 the output of which is suitably filtered and then passed through voltage regulators 120 and 121. The direct current thus produced is utilized to operate the vacuum tubes of amplifier 20, FIG. 23. The filaments of the several vacuum tubes in amplifier 20 are not shown, but it will be understood that filament current for these may be supplied from the extra secondary winding 122 at transformer 108.

The pick-up coil 17 is shown in FIG. 23 as feeding its output voltage, which is directly proportional to the amplitude of the vibration and consequently to the magnitude of the unbalance, to the calibration potentiometer 123 which modifies the voltage so that the meter relay 22 will read directly in units of the needed unbalance correction.

The vacuum tubes 124 and 125 and their associated components amplify the calibrated voltage without changing the wave shape. The inductance 126 and the capacitance 127 constitute a tuned inductive-capacitive filter that bleeds off any transient voltage that is at a frequency other than the frequency of the rotation of the workpiece.

The inductance-capacitance filter 126–127 only passes voltage of a frequency corresponding to the rotational frequency of the workpiece and of a sine wave shape with an amplitude directly proportional to the unbalance of the workpiece and such voltage is applied across a voltage divider 128.

A portion of the voltage across divider 128 is amplified by the vacuum tube 129 and its associated components and is then fed to the rectifier 130. The direct current output of rectifier 130 is proportional to the unbalance of the workpiece and is impressed upon the coil 131 of the voltmeter relay 22 whereby the needle 132 of the voltmeter is deflected an amount proportional to the unbalance of the workpiece.

The voltmeter relay needle 132 operates between two contact points, one contact 133 being positioned at the zero meter reading, and the other contact 134 being positioned at the tolerance limit point of meter indication, i.e., at the point where the needle will indicate an unbalance in the workpiece that equals or exceeds a predetermined tolerance limit for unbalance.

The meter relay needle 132 is connected to the negative side of the coil 131. As the needle 132 touches zero contact 133 it completes a circuit that de-energizes relay 135 closing contacts 135–1 in line L30 of FIG. 20 and stops or prevents the weighing operation. As the needle touches tolerance limit contact 134 it completes a circuit that de-energizes relay 136 closing contacts 136–1 in line L21 of FIG. 20.

For this purpose, and to control the voltage level of contacts 133 and 134, the transformer 109 feeds the rectifier tube 137 which in turn supplies direct current to vacuum tubes 138 and 139 which are used to control relays 135 and 136, respectively, and which provide a high impedance, low current load for the meter relay contacts 133 and 134.

So long as the meter needle 132 does not contact the tolerance limit contact 134, the cathode of tube 139 is held positive with respect to the negative side of the meter coil 131 by the voltage divider 140, and the control grid of tube 139 is held at the same voltage level or slightly positive with respect to the cathode by the resistor 141. At this time the tube 139 is conducting and energizes relay 136 so that the normally closed contacts 136–1 of the relay are held open.

If the unbalance in the workpiece does not exceed the accepted tolerance the needle 132 never touches contact 134 and relay 136 remains energized. If this condition continues until time delay relay 117 closes contacts 117–1 in line L25 relay 118 will close contacts 118–3 in L28 and energize time delay relay 214 to energize the clutch of mechanism 92 and start the loader motor 91.

At the same time relay 118 will open contacts 118–2 in line L17 and de-energize relay 115 which in turn by opening contacts 115–2 in line L19 will de-energize time delay relay 116. De-energization of relay 116 will immediately open contacts 116–3 to de-energize the clutch of mechanism 14. Contacts 116–2 in line L14 will close immediately while contacts 116–1 will remain closed to effect energization of the brake of mechanism 14. Contacts 116–1 are timed to open after stopping of spindle 6 by the brake.

Upon stopping of the spindle the loader clutch of mechanism 92 actuates the loader through its cycle to remove the workpiece 19 from adapter 7 and to deliver the same onto outgoing conveyor 4. The loader will at the same time deliver the next workpiece from conveyor 3 to the adapter 7.

If the unbalance of a workpiece being tested exceeds the tolerance limit for unbalance, needle 132 will engage contact 134. This will bring the control grid for vacuum tube 139 down to the voltage level of the negative side of the meter coil 131 while the cathode of the tube will still be held positive by voltage divider 140. The grid bias will then be sufficiently negative to cause vacuum tube 139 to cut off and stop conducting and relay 136 will then become de-energized letting its contacts 136–1 close.

At this time the contacts 116–4 in line L21 of time delay relay 116 are closed, and closing of the contacts 136–1 of relay 136 energizes relay coil 142 in line L21. A holding circuit for relay coil 142 is immediately established around relay contacts 136–1 by the closing of contacts 142–1 in line L22.

Energization of relay 142 closes contacts 142–2 in line L23 and thereby energizes relay 143 which immediately closes a holding circuit bypassing contacts 142–2 by closing contacts 143–1 in line L24. Contacts 143–2 in line L25 are then opened so that during weighing the relay 118 in line L25 remains de-energized. Contacts 142–3 in line L34 are closed by relay coil 142 and thereby start the weighing motor 36 which drives the weighing potentiometer 35, FIG. 23.

A rectifier 144 is connected to receive alternating current from transformer 145 the primary of which is supplied from line L8 feeding transformer 109, as shown in FIGS. 20 and 23. The rectifier 144 supplies a direct current voltage across potentiometer 146 of a constant magnitude regardless of possible fluctuations of line voltage. The adjustable tap on potentiometer 146 adjusts the voltage as it goes to the weighing potentiometer 35 so that it will be proportionate to the voltage in the voltmeter coil 131 for weighing purposes.

The voltage output of the weighing potentiometer 35 is fed directly to the voltmeter relay coil 131 in opposite polarity to that fed thereto from rectifier 130. Thus, with the unbalance voltage impressed upon the coil 131 of voltmeter relay 22 tending to move the needle 132 toward contacts 134, the slide tap on weighing potentiometer 35 is moved by motor 36 until an equal and opposite voltage is impressed on the coil 131 of voltmeter 22 and the needle 132 is brought back to a zero reading or until it reaches the zero contact 133.

The movement of the slide tap on potentiometer 35 then becomes a direct measure of the unbalance in the workpiece. The shaft 147 of the weighing potentiometer 35 may constitute the shaft of the transmitter selsyn generator 37 which then will have its rotor turn in direct measurement of the unbalance in the workpiece.

The selsyn generator 37, line L37, drives the selsyn receiver or motor 38, line L37, in exact proportion so that the depth control cam 39 is turned by motor 38 to the exact position for setting the depth of the drilling operation.

When the meter needle 132 reaches zero contact 133 it closes a circuit that lowers the voltage level of the control grid of vacuum tube 138 to that of the negative side of the meter coil 131. Since the cathode of the tube 138 is still held positive, the resulting grid bias becomes sufficiently negative to effect a cut-off of the tube so that it no longer conducts, and relay 135 in line L30 is de-energized and its contacts 135–1 in line L30 are closed. When the contacts 135–1 of relay 135 close upon completion of the weighing operation the coil of a relay 148 in line L30 through the closed contacts 116–5 is energized to stop the weighing motor 36.

For this purpose the weighing motor 36 is shown as reversible depending upon whether current flows to it through lead 149 line L34 or through lead 150 line L36. When current is fed to the motor 36 through both leads 149 and 150 a braking of the motor is effected. During weighing actuation of the motor, current is fed thereto through lead 149 by closing of contacts 142–3 as previously described.

When relay 148 is energized it closes contacts 148–1 in a cross lead 151 between leads 149 and 150, thereby feeding current to the motor through lead 150 as well as lead 149 to brake the motor.

The weighing potentiometer 35 is calibrated by the potentiometer 146 so that it functions from zero to one hundred units of sliding tap adjustment and when the slide reaches the 100 unit mark it will engage and close a limit switch 152 thereby energizing time delay relay 153 in line L31. Upon energizing of relay 153, the latter closes contacts 153–4 in a second cross lead 154 between leads 149 and 150, thereby braking the motor 36 at the position of 100 units of unbalance which coincides with the maximum depth of drill correction obtainable at the given setting. As will be described hereinafter and shown by the block diagram, FIG. 19, this maximum correction will be made off angle as related to the angle of maximum unbalance, so that a second weighing and correction cycle will then be necesary to bring the workpiece within tolerance limits of unbalance.

Summarizing the foregoing weighing operation the 100 units of potentiometer 35 corresponds with the maximum depth of drill correction permissible in the workpiece. Where the unbalance is less than that requiring this maximum drill depth correction the meter needle 132 reaches zero contact 133 thereby braking the weighing motor 36 as previously described. Where the unbalance is greater than that requiring the maximum depth of drill correction permissible in the workpiece the tap slide of potentiometer 35 reaches the 100 unit mark and closes limit switch 152 which thereupon brakes the weighing motor as previously described.

When the weighing motor 36 is stopped by needle 132 reaching the zero contact 133, the motor 38 has adjusted the depth control cam 39 to the position where it will limit the drill depth to the exact amount needed for correcting the unbalance in the workpiece. When the weighing motor 36 is stopped by the tap slide of potentiometer 35 reaching the 100 unit mark, the motor 38 has adjusted the depth control cam 39 to the maximum drill depth position permissible and a phase shift is effected in the angle setting to purposely offset the correction so that material is available for the second correction that will be needed to complete the balancing of the workpiece.

During this weighing operation the relay 143 is energized and opens the contacts 143–2 in line L25 thereby making it impossible for relay 118 to start the loader 5. Also contacts 143–3 in line L17 are opened by relay 143 to cause contacts 111–2 to lose control of relay 115 that controls clutch 14 for the spindle motor 15.

The angle determination is effected automatically during the weighing portion of the cycle. For this purpose a portion of the voltage across the voltage divider 128 is fed to the grid of vacuum tube 155 which is one of a series of vacuum tubes including also tubes 156 and 157 which, with their associated components amplify and modify the sine wave shaped unbalance voltage until a square wave shaped voltage is produced.

The positive going fronts of the square wave voltage thus produced correspond with the rotational position of the workpiece in which the radius containing the angular location of maximum unbalance extends towards the pickups in the direction of the pickup vibration movement. The negative going fronts of the voltage waves occur 180° or one-half a revolution later and when the radius containing the angular location of maximum unbalance extends away from the pickups.

The condenser 158 and resistor 159 are connected to the output of tube 157 to serve as a differentiator, making positive pulses from the positive fronts of the square wave voltage and negative pulses from the negative fronts of the square wave voltage. These pulses are fed to the control grid of vacuum tube 160 so that there is at this grid a positive pulse once every revolution of the workpiece, and which is in phase with the rotational location of the radius containing the unbalance for the workpiece at which location said radius is parallel to the maximum vibration movement actuating the pickup and toward the pickup.

If this positive pulse were used to trigger a stroboscope light as employed in many unbalance indicating machines in association with a numbered band on the workpiece, each time the light flashed the stroboscope effect would make the number on the band corresponding to the radius of the maximum unbalance appear to stand still as it registers in line with the pickup. In the present instance this stroboscopic indication is read automatically and means are provided to automatically index the workpiece to the rotational position of such automatic reading, as set forth in the copending application of Werner I. Senger, Serial No. 468,397 and now Patent No. 2,944, 424, referred to above.

Since it is desired to employ a drill located angularly with respect to the location of the pickup, it becomes necessary to shift the phase of the pulse triggering the stroboscope light an amount corresponding to the angular displacement between the drill and the pickup.

For this purpose the vacuum tube 160 provides the input of a multi-vibrator which has an output vacuum tube 161 that passes a square voltage wave of the desired phase relation to the input pulses to effect the desired angular reading for the point of maximum unbalance in the workpiece in line with the drill when the maximum unbalance pickup is attained.

The square wave voltage from tube 161 is fed to the grid of amplifier tube 162, the output of which is fed to the grid of a second amplifier tube 163. The output of tube 163 passes through a differentiator to provide the positive pulses for triggering the stroboscope light 23. For the purpose of later indexing of the workpiece as described in the Senger application Serial No. 468,397 and now Patent No. 2,944,424 referred to above, an oscillator including vacuum tube 164 and associated parts supplies a sinusoidal voltage of a frequency corresponding to that of the pulses supplied by tube 161, and which is fed through tubes 162 and 163 to trigger the stroboscope light 23. The actuation of tube 164 will be described more fully hereinafter.

The circuit for the angle reader is shown in FIG. 24. Current is supplied to this circuit by transformer 110 in line L9 and then passes through the rectifier tube 165 and from thence through filters and voltage regulator tubes 166 and 167 which give the needed direct current voltage for operation of the reader.

The reader comprises the photo-electric tube 27 on carriage 28 and which is adapted to be rotationally translated about the light 23 until it receives light through slot 25 at the moment the light flashes for each revolution of the workpiece. For this purpose, when the phototube 27 is so positioned that the slot 25 in shield 24 rotating with the workpiece is in line with the phototube and the lamp 23 at the instant the stroboscope light 23 flashes, the phototube 27 will register a series of pulses, one for each revolution of the workpiece.

The pulses thus produced by tube 27 are amplified by vacuum tubes 168 and 169 and their associated components and then fed into the multi-vibrator consisting of vacuum tubes 170 and 171 and their associated components. The multi-vibrator is constructed to produce two output voltages, one from each of tubes 170 and 171, and each of which is in the form of a square wave, but in opposite phase.

The square wave output voltage from tube 170 of the multi-vibrator is fed to the grid of control tube 172 and the square wave output voltage from tube 171 is fed to the grid of control tube 173. The output of the control tubes 172 and 173 and their associated components including the voltage divider 174 is utilized to supply a constant plate current to the relay 175 to thereby close its normally open contacts 175-1 in line L39 when tube 27 is positioned to respond to light from the flashing stroboscope lamp 23.

Various types of photo-electric reader devices may be employed as referred to in the Senger application noted above. In the present illustration the leading edge of the slot 25 is used to determine the angle of unbalance, and the phototube carriage 28 is stopped at the point at which the phototube is going from dark to light. This must be so whether the phototube 27 starts on light or on dark.

If the angle reader starts with the phototube 27 on dark when relay 142 is energized by needle 132 engaging tolerance limit contact 134, the angle determining motor 29 in line L44 is started in a forward direction by the closing of contacts 142-4 in line L43. Energization of relay 142 closes the normally open contacts 142-5 and 142-6 in line L47, thereby energizing time delay relay 176 in line L47 to open its contacts 176-1 in line L50 removing control from contacts 177-2 and also closing its contacts 176-2 in line L45.

When carriage 28 moves the phototube 27 to a position where light initially reaches the tube from light 23 passing the leading edge of slot 25, relay 177 in line L39, is energized by closing of the contacts 175-1 in line L39 of relay 175. Contacts 177-1 in line L47 are thereupon opened de-energizing time delay relay 176. At the same time contacts 177-3 in the vertical line between lines L43 and L44 are closed effecting the passing of current to angle motor 29 from both lines L43 and L45 to brake and stop the motor, to thereby stop carriage 28.

After a substantial time following de-energization of time delay relay 176 the contacts 176-2 in line L45 open leaving motor 29 free from electromagnetic braking action. This time delay may be such as to brake the motor 29 during angular indexing of the workpiece and until unbalance correction is begun.

If the angle reader starts with the phototube 27 receiving light from flash tube 23 the angle motor 29 in line L44 starts upon closing of contacts 142-4 in line L43 because the normally open timer contacts 176-2 in line L45 remain open since time delay relay 176 in L47 is prevented from being energized due to the opening of contacts 177-1, until after time delay relay 178 has been energized opening contacts 178-2. This starting of the motor 29 is sufficient to rotate carriage 28 until phototube 27 passes beyond registry with light coming through slot 25, at which time delay relay 178 loses control and thereupon the further control of carriage 28 continues as though the reader started with the phototube 27 in the dark as described above.

During this transition from light to dark for tube 27, the time delay relay 178 in line L50 becomes energized by the closing of contacts 142-7 and 177-2 and the fact that contacts 176-1 are normally closed. Energization of relay 178 closes contacts 178-1 in line L46 and which thereupon effects energization of time delay relay 176 in line L47. At the same time contacts 176-2 in line L45 are closed and contacts 178-2 in the vertical line between lines L44 and L45 are opened so that motor 29 continues to drive carriage 28 forward. When relay 176 is energized the contacts 176-1 in line L50 open to de-energize relay 178. Contacts 178-1 then times open and contacts 178-2 times closed in approximately one-half a revolution of the carriage 28. Contacts 177-3 just below line L43 and contacts 177–1 in line L47 thereupon have full control for continued operation and stopping of motor 29 as previously described.

When an angle reading is completed and motor 29 is braked to hold carriage 28 and phototube 27 fixed at the angle determination of the reader, relay contacts 177–4 in line L52 are closed to supply current through the already closed contacts 142–9 and the normally closed contacts 178–3 to relay 179 in line L52.

Energization of relay 179 closes its contacts 179–1 in line L54. Thereupon when needle 132 reaches zero contact 133 and the weighing is complete contacts 148–2 in line L54 are closed and current is supplied through contacts 179–1, 148–2, already closed contacts 142–8, and normally closed contacts 180–3 of relay 180 to energize the weighing and angle complete relay 181.

If instead of the needle 132 reaching zero contact 133, the potentiometer 35 reaches the 100 unit mark indicating the necessity for a double correction and the time delay relay 153 is energized, contacts 153–1 in line L55 will be closed after a predetermined delay. Contacts 153–3 in line L53 will close to energize relay 182 in line L53 (see also FIG. 23). Energization of relay 182 shifts the contacts in the multi-vibrator between input tube 160 and output tube 161 so that the flashing of light 23 is out of phase with the rotation of the workpiece a predetermined angular amount thereby shifting the flashing light away from the position of phototube 27.

Since the phototube 27 is no longer receiving light the angle motor 29 must thereupon continue to drive carriage 28 until the phase shift is compensated. Failure of light to reach phototube 27 opens relay contacts 175–1 in line L39 and de-energizes relay 177 thereby opening contacts 177–3 and again starting motor 29. When light again reaches tube 27 contacts 177–3 close and brake motor 29 through contacts 153–2 in line L44 which have been closed by energization of relay 153 in line L31 by closing of limit switch 152. The time delay in closing of contacts 153–1 in line L55 provides the time necessary for this phase shift of the angle setting before relay 181 is energized.

When relay 181 is energized and interlocked by the closing of contacts 181–1 in line L56 and which bypasses contacts 142–8, 148–2, 179–1 and 153–1 the weighing angle determining portion of the cycle is complete. Contacts 181–2 in line L17 open to de-energize relay 115, thereby opening contacts 115–2 in line L19 and de-energizing relays 116 and 117 and braking the spindle motor 15 by the clutch and brake mechanism 14 actuated by contacts 116–1, 116–2 and 116–3. The opening of contacts 116–4 and 116–5 de-energizes the control relays 142 and 148.

The next step in the cycle is to index the workpiece so that the side of maximum unbalance to be corrected will register with drill 30 or other correction equipment. With relay 181 in line L54 energized and interlocked by contacts 181–1, the index step starts.

For this purpose contacts 181–8 in line L57 close to energize relay 183 in line L57 (see also FIG. 24) and thereby connect the oscillator containing tube 164 to the amplifier tubes 162 and 163 which trigger the stroboscope light 23.

The same leading edge of slot 25 that determined the angle setting for phototube 27 and carriage 28 is employed for indexing the workpiece. For this purpose the indexing must be accomplished the same regardless of whether at the start of the index the phototube 27 is in the dark or is receiving light from light 23.

If the index starts with phototube 27 in the dark, as is the usual condition, the index motor 184 in line L48 (see also FIG. 9), is started upon closing of contacts 181–3 in line L48 and 181–5 in line L48, passing current through normally closed contact 177–1 to the motor 184. At the same time the time delay relay 185 in line L49 which is connected in parallel to index motor 184 is energized. When phototube 27 on carriage 28 reaches the light passing the leading edge of slot 25 the tube energizes relay 177 which opens contacts 177–1 in line L47 which removes power from index motor 184 and de-energizes time delay relay 185. Contacts 185–1 in line L51 will remain open thereby preventing energization of relay 178 until after the correction step has started, at which time contacts 181–6 in line L51 will be open.

Contacts 185–3 in line L13 re-closes and with contacts 181–7 closed by relay 181 the brake coil of mechanism 14 is energized to brake the spindle 6. The workpiece is now fixed in index position relative to drill 30.

If the index step starts with the phototube 27 receiving light from light 23 when relay 181 is energized, the index motor 184 is started by closing of contacts 181–3 and 181–5 in line L48. At this time the contacts 177–1 in line L47 are open due to energizing of relay 177 in response to phototube 27. However, current bypasses contacts 177–1 by reason of the closing of contacts 178–1 in line L46. For this purpose relay 178 in line L50 is energized by the closing of contacts 177–2 and passing of current through the already closed contacts 181–6 in line L51 and the normally closed contacts 185–1.

Upon starting of the index motor 184 under dark conditions the time delay relay 185 is energized and opens contacts 185–1 in line L51, preventing the energizing of time delay relay 178. Contacts 185–1 remain open until the correction step is started, thus preventing energization of relay 178 when phototube 27 receives light again.

The contacts 178–1 in line L46 are delayed in opening upon de-energization of time delay relay 178 until after the phototube 27 is in the dark, and thereupon contacts 177–1 in line L47 close to keep the index motor operating. When phototube 27 reaches the light again, which corresponds to the desired index position for the workpiece, relay 177 energizes and opens contacts 177–1 to stop the index motor 184.

With contacts 181–4 and 185–2 in line L58 closed, the energization of relay 177 by completion of the indexing operation will close contacts 177–5 in line L58 and thereby pass current through the normally closed contacts 178–4 to energize the time delay relay 180 in line L59. For this purpose contacts 185–2 delay in opening after de-energization of relay 185 at the time the index motor 184 is stopped.

For the purpose of indexing, motor 184 drives the spindle 6 slowly in the same direction as it is driven during unbalance determination and weighing by motor 15 so that the same leading edge of slot 25 controls the final index position for the workpiece as formerly triggered the index of carriage 28 relative to the angle of maximum unbalance in the workpiece.

At the completion of the indexing step of the cycle the energization of time delay relay 180 closes contacts 180–2 in line L59 to provide a holding circuit for relay 180. Contacts 180–3 in line L54 are opened to thereupon de-energize relay 181 thereby returning its several contacts to normal. When contacts 180–1 in line L59 times open after a predetermined delay to de-energize relay 180, the relay 181 remains de-energized by reason of the opening of its holding circuit through contacts 181–1, until the next cycle of operation.

Relay 180 is energized for a sufficient time to start the correction cycle by the closing of contacts 180–2 in line L60 and which effects current flow through normally closed contacts 186–1 to energize time delay relay 187. Energization of relay 187 closes a holding circuit bypassing contacts 180–3 by closing of contacts 187–2 in line L61 so that when relay 180 de-energizes and opens contacts 180–3 the time delay relay 187 remains energized through the holding circuit and normally closed contacts 186–1.

Figure 18:
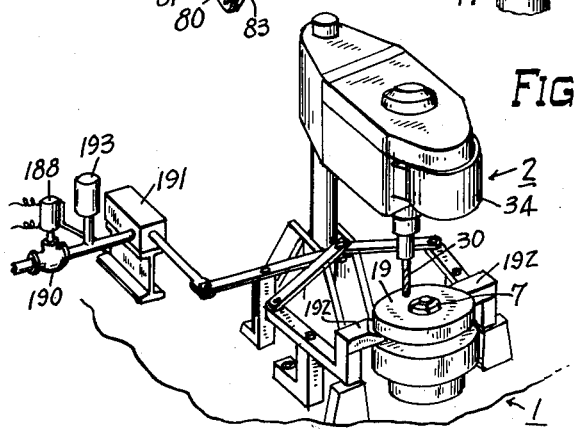
FIG. 18 is a detail perspective showing the work support and thrust device for unbalance correction.
Figure 4:
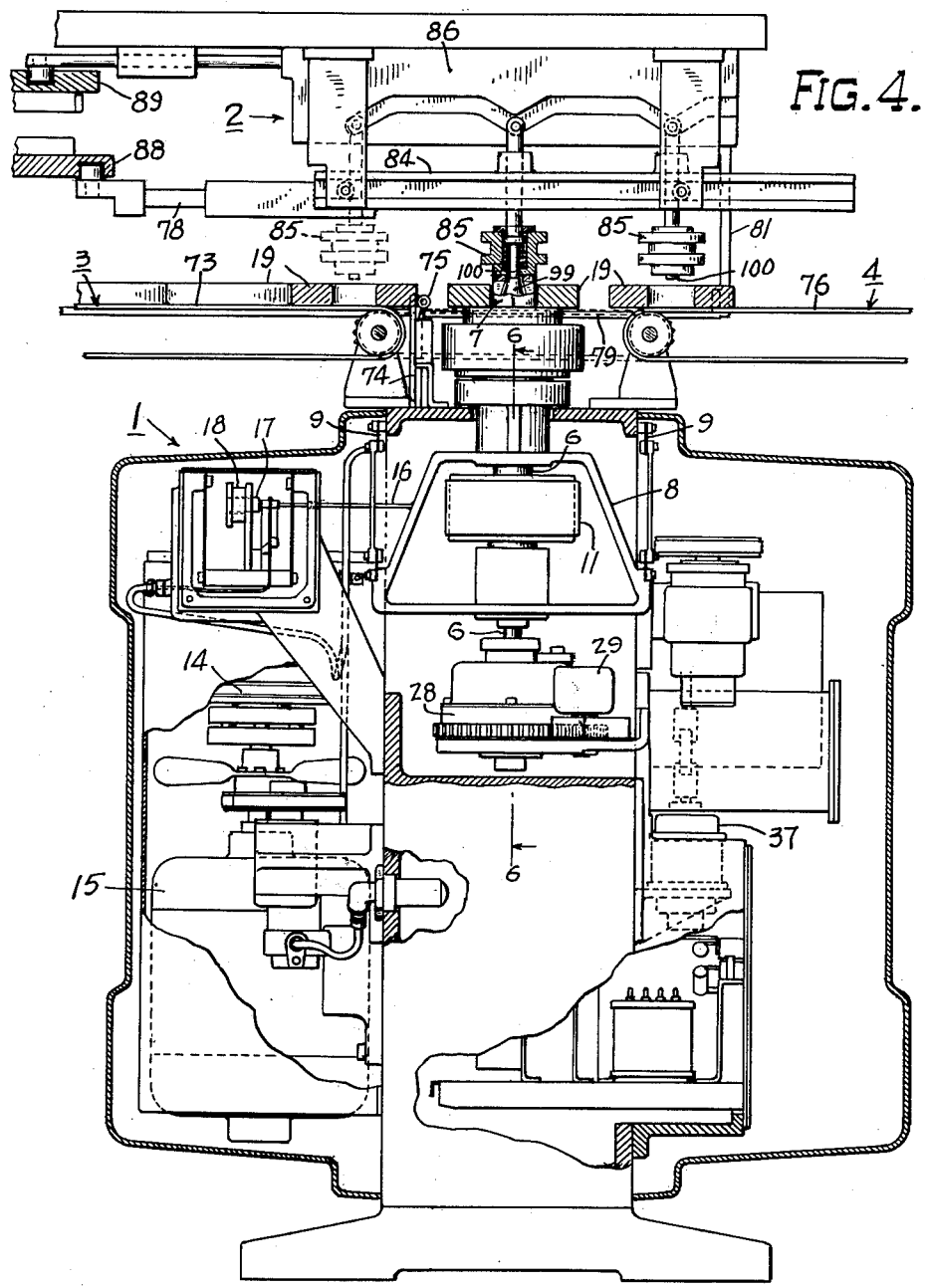
FIG. 4 is an enlarged front elevation of the balance measuring portion of the machine with the front casing broken away and showing the various parts partially in section.
Figure 5:
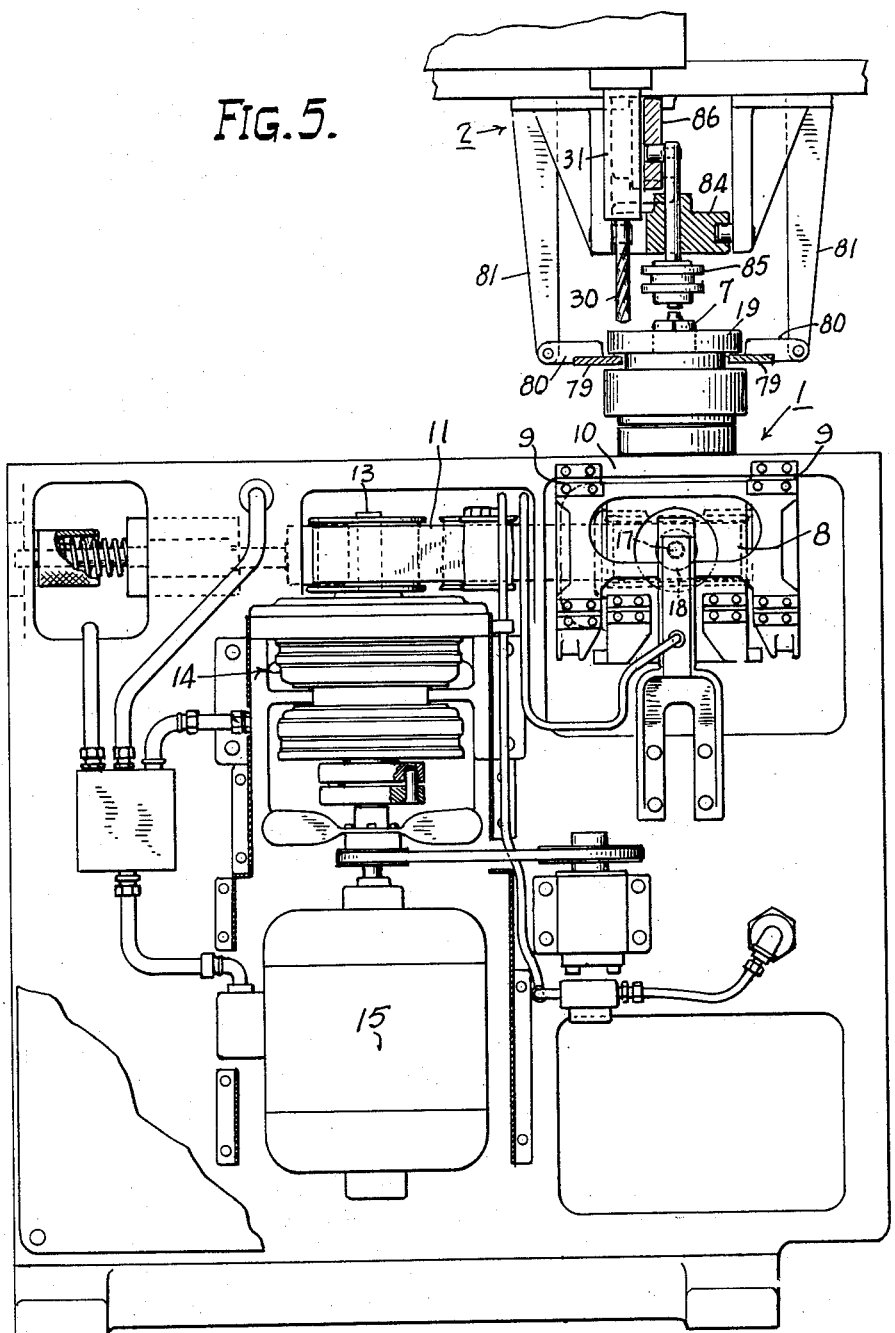
FIG. 5 is a view similar to FIG. 4 of the left end elevation of the machine with the casing broken away.

Closing of contacts 187–2 energizes solenoid 188 in line L62 which effects a supporting of the workpiece to hold it against displacement during drilling as shown in FIG. 18. This supporting of the workpiece against the drill thrust is continued throughout the correction step of the cycle and until contacts 186–1 are opened to de-energize relay 187 and open contacts 187–2 which thereupon de-energizes the support solenoid 188.

Upon energization of time delay relay 187 the normally closed contacts 187–1 in line L61 remain closed for a predetermined time delay period sufficient to energize the selsyn set solenoid 189 for actuating valve 43 to secure the depth cam and effect setting of the depth control mechanism.

The depth cam 39 is clamped against displacement during setting of plunger 40 by means of the hydraulic fluid actuated clamp 41 in response to relay 187. At the same time fluid under pressure passes through valve 190 and enters a power cylinder 191 to actuate the support arms 192 to hold the workpiece 19 against the drill thrust and thereby relieve the spindle 6 and its bearing from drill thrust.

When the workpiece is supported by arms 192 the pressure switch 193 is actuated by a build up of hydraulic pressure in the conduit leading to the support cylinder 191 and closes to supply current through the already closed contacts 187–3 in line L63 to a time delay relay 194 in line L64.

At the same time current is similarly supplied to relay 195 in line L65, and which upon energization closes contacts 195–1 in line L33. Closing of contacts 195–1 energizes relay 196 which thereupon closes contacts 196–1 in line L36 to reverse the weighing motor 36 and return the potentiometer 35 to starting position for the next cycle. Contacts 196–2 are opened by energization of relay 196 to remove any braking action for motor 36 in case the potentiometer 38 is at the 100 unit mark with contacts 153–4 closed. Contacts 196–3 are closed so that the weighing motor 36 may be braked upon closing of contacts 215–1. When the weighing potentiometer 35 reaches zero it closes a limit switch 197 in line L32 which energizes a relay 215 and thereby closes contacts 215–1 in the third cross line for motor 36. Contacts 196–3 in the same line as contacts 215–1 are also closed as previously stated to thereby supply current to both sides of motor 36 and brake the latter to a stop.

Also upon actuation of the support arms 192 by cylinder 191 and closing of the pressure switch 193, a circuit is completed through contacts 187–3, pressure switch 193 and contacts 194–1 to solenoid 44 which actuates brake 48 and starts the drill 30 in forward traverse.

When the drill 30 engages the work the build up of fluid pressure in the upper or power end of cylinder 33 actuates a lever 198 which closes limit switch 199. For this purpose lever 198 is shown in detail in FIG. 11 as being mounted on a pivot 200 with the adjustable spring 201 normally holding the lever in engagement with the switch button to keep the switch open. A piston 202 responsive to the sudden build up of back pressure from the power side of cylinder 33 engages the lever 198 to pivot it against spring 201 and release the switch button to close limit switch 199.

Closing of limit switch 199 in line L68 supplies current through the normally closed contacts 203–3 to relay 204. Relay 204 is interlocked by closing of contacts 204–1 in line L69 bypassing limit switch 199. Energization of relay 204 closes contacts 204–2 in line L67 which energizes the solenoid of solenoid plunger 46 actuating clamp 41 to secure stop plunger 40 to ram 32.

When the drill reaches its correction depth, stop plunger 40 engages a lever 205 that closes limit switch 42 to stop the drill feed as previously described. For this purpose when limit switch 42 in line L71 closes, it energizes relay 203 in line L72.

Energization of relay 203 closes contacts 203–1 to effect continued energization of the relay through the closed contact 206 in line L72 so that when clamp 41 is released and switch 42 opens the relay 203 is actuated until ram 32 returns upwardly to start position where limit switch 206 actuates to open contacts 206–1.

When relay 203 is energized it closes contacts 203–2 in line L70 to energize solenoid 45 and actuate valve 47 to reverse the ram 32 and back traverse it to starting position.

When ram 32 has reached its retracted position limit switch 206 actuates contacts 206–1 to open the same and thereby de-energize relay 203 and open contacts 203–2 to de-energize solenoid 45.

At the same time limit switch 206 closes contacts 206–2 to energize time delay relay 207 in line L73. Contacts 207–1 in line L74 delays in opening a sufficient time to energize a solenoid 208 which reverses the plunger 40 to release clamp 41 and withdraw arms 192 from the workpiece. Before contacts 207–1 open relay 186 in line L75 is energized to open contacts 186–1 in line L60 and thereby de-energize time delay relay 187 and open its interlock contacts 187–2.

De-energization of time delay relay 187 returns the correction controls to start position ready for the next cycle.

Contacts 187–4 in line L76 are closed at the start of the correction step when relay 187 is energized, and thereby energizes time delay relay 209 in line L76 which in turn closes contacts 209–1 in line L77 to energize solenoid 210 and actuate a suitable chip remover (not shown) during the drilling operation. Upon completion of the drilling operation and de-energization of relay 187, the contacts 187–4 open to de-energize relay 209 and solenoid 210 and stop the chip remover.

When arms 192 return to release position they close limit switch 211 in line L78 which energizes time delay relay 212 and also energizes relay 213 in line L79 until contacts 212–1 in line L79 open after a predetermined time delay.

Energization of relay 213 for a short period at the end of the correction step opens contacts 213–1 in line L23 so that relay 143 is de-energized removing its interlock by opening contacts 143–1 so that relay 143 remains de-energized until the next cycle. Contacts 143–3 in line L17 close and since contacts 114–2 are closed and contacts 111–2 are closed by reason of loader carriage keeping limit switch 96 closed, relay 115 is energized and starts the spindle motor by closing of contacts 115–2.

Thereupon the workpiece is again checked for unbalance, and in the event its unbalance is within the tolerance limit so that needle 132 fails to reach the tolerance contact 134, the workpiece is removed by loader 5 as previously described and the next workpiece is transferred from conveyor 3 to the spindle 6.

Where the unbalance in the workpiece exceeded 100 units on the potentiometer 35 and the drilling operation was adjusted offset from the angle location of maximum unbalance the second check will generally show an unbalance exceeding the tolerance limit so that a second correction for unbalance is made. This second correction will be at an angle different from the original offset angle of correction and for an amount less than the 100 units of the weighing potentiometer 35.

The machine may have means for indicating when the drill 30 becomes dull so as to make the correction inaccurate. For this purpose a normally open limit switch 216 (FIG. 11) is closed by piston 202 in the event the drill is dull and builds up sufficient back pressure to exceed the tension adjustment for spring 201. Closing of limit switch 216, see line L66 in FIG. 22, energizes a signal 217 which may be a light or other signal means indicating that the drill should be changed.

A monitoring device such as that set forth in copending application Serial No. 514,961, filed June 13, 1955, and now Patent No. 2,986,920, by Robert J. Fibikar, one of the present inventors, may be employed to assure the proper functioning of the inspection operation and prevent scrap of workpieces by reason of faulty operation of the machine.

The invention provides a fully automatic unbalance determining and correcting machine adapted for mass production of like parts.

The accompanying claims particularly point out and distinctly set forth the subject matter regarded as the invention.

We claim:

1. An automatic balancing machine adapted to measure the unbalance in successive like rotary workpieces and to correct therefor, comprising workpiece handling apparatus adapted to load successive workpieces into the unbalance measuring and correcting apparatus and to remove successive workpieces therefrom, unbalance measuring apparatus adapted to measure the unbalance in each successive workpiece and to determine the angle of maximum unbalance therein, unbalance correcting apparatus, means directly responsive to and controlled by said measuring apparatus to adjust said correcting apparatus and determine the correction to be made in each given workpiece at the angle of maximum unbalance in accordance with the amount of unbalance therein as determined by said measuring apparatus, means directly responsive to said angle determining apparatus to angularly index the workpiece relative to said correction apparatus in accordance with the unbalance angle determination by said unbalance measuring and determining apparatus, individual electrical power means for driving said apparatuses and means, and interlocking means in the circuits of said individual power means to effect actuation of the same in automatic correlation in successive cycles for corresponding successive workpieces without stopping between workpieces.

2. An automatic balancing machine adapted to measure the unbalance in successive like rotary workpieces and to correct therefor, comprising workpiece handling apparatus adapted to load successive workpieces into the unbalance measuring and correcting apparatus and to remove successive workpieces therefrom, unbalance measuring apparatus adapted to measure the unbalance in each successive workpiece and to determine the angle of maximum unbalance therein, said unbalance measuring apparatus comprising means to first determine whether each successive workpiece exceeds a predetermined tolerance limit for unbalance, and means to automatically actuate the workpiece handling apparatus in direct response to said first means to discharge the workpiece if it is within the tolerance limit and to load the next workpiece into the machine, said first named means functioning to automatically initiate the unbalance measuring and correcting cycle if the unbalance in the workpiece exceeds the predetermined tolerance limit for unbalance, unbalance correcting apparatus, means directly responsive to and controlled by said measuring apparatus to adjust said correcting apparatus and determine the correction to be made in each given workpiece at the angle of maximum unbalance in accordance with the amount of unbalance therein as determined by said measuring apparatus, means directly responsive to said angle determining apparatus to angularly index the workpiece relative to said correction apparatus in accordance with the unbalance angle determination by said unbalance measuring and determining apparatus, and means to actuate all of said apparatuses and means automatically in correlation in successive cycles for corresponding successive workpieces, whereby unless the workpiece exceeds the tolerance limit for unbalance and needs correction said measuring and correcting apparatuses do not function for the given workpiece.

3. An automatic balancing machine adapted to measure the unbalance in successive like rotary workpieces and to correct therefor, comprising workpiece handling apparatus adapted to load successive workpieces into the unbalance measuring and correcting apparatus and to remove successive workpieces therefrom, unbalance measuring apparatus adapted to measure the unbalance in each successive workpiece and to determine the angle of maximum unbalance therein, unbalance correcting apparatus, means to determine the correction in each given workpiece in accordance with the amount of unbalance therein as determined by said measuring apparatus, means to angularly index the workpiece relative to said correction apparatus in accordance with the unbalance angle determination by said unbalance measuring and determining apparatus, means to limit the measurement of the amount of unbalance to a predetermined amount generally corresponding to the limit of correction available at the angle location of maximum unbalance, means actuated in response to the unbalance in any given workpiece exceeding said limit to shift the angle of correction a predetermined amount and limit the correction to correspond with said predetermined limit, and means to re-cycle the measuring and correcting apparatuses to complete the correction of unbalance for the given workpiece.

4. An automatic balancing machine adapted to measure the unbalance in successive like rotary workpieces and to correct therefor, comprising workpiece handling apparatus adapted to load successive workpieces into the unbalance measuring and correcting apparatus and to remove successive workpieces therefrom, unbalance measuring apparatus adapted to measure the unbalance in each successive workpiece and to determine the angle of maximum unbalance therein, unbalance correcting apparatus, means directly responsive to and controlled by said measuring apparatus to adjust said correcting apparatus and determine the correction to be made in each given workpiece at the angle of maximum unbalance in accordance with the amount of unbalance therein as determined by said measuring apparatus, means directly responsive to said angle determining apparatus to angularly index the workpiece relative to said correction apparatus in accordance with the unbalance angle determination by said unbalance measuring and determining apparatus, means to actuate all of said apparatuses and means automatically in correlation in successive cycles for corresponding successive workpieces, and means to re-check the unbalance in each workpiece after correction for unbalance therein to determine whether any unbalance therein is within a predetermined tolerance limit for unbalance before the workpiece is removed by said handling apparatus.

5. An automatic balancing machine adapted to measure the unbalance in successive like rotary workpieces and to correct therefor, comprising workpiece handling apparatus adapted to load successive workpieces into the unbalance measuring and correcting apparatus and to remove successive workpieces therefrom, unbalance measuring apparatus adapted to measure the unbalance in each successive workpiece and to determine the angle of maximum unbalance therein, unbalance correcting apparatus, means directly responsive to and controlled by said measuring apparatus to adjust said correcting apparatus and determine the correction to be made in each given workpiece at the angle of maximum unbalance in accordance with the amount of unbalance therein as determined by said measuring apparatus, means directly responsive to said angle determining apparatus to angularly index the workpiece relative to said correction apparatus in accordance with the unbalance angle determination by said unbalance measuring and determining apparatus, individual electrical power means for driving said apparatuses and means, interlocking means in the circuits of said individual power means to effect actuation of the same in automatic correlation in successive cycles for corresponding successive workpieces, without stopping between workpieces, and a single support provided for the workpiece in both the unbalance measuring apparatus and the unbalance correcting apparatus, whereby the machine has a single operative work station.

6. An automatic balancing machine comprising unbalance measuring apparatus adapted to determine the amount of unbalance and the angular location thereof in a rotary workpiece, unbalance correcting apparatus responsive to said measuring apparatus to effect the needed correction at the angle for maximum unbalance in the workpiece, means to operate said apparatuses in correlation whereby all of the measuring intelligence is automatically utilized in controlling the correction for each given workpiece, and means to feed successive workpieces to the machine and to successively remove workpieces from the machine automatically in correlation to cycles of measuring and correcting unbalance in said workpieces, and means automatically operated in correlation to said feeding means to initiate a cycle of operation for said measuring and correcting apparatuses following the loading of each successive workpiece in the machine.

7. An automatic balancing machine comprising unbalance measuring apparatus adapted to determine the amount of unbalance and the angular location thereof in a rotary workpiece, unbalance correcting apparatus responsive to said measuring apparatus to effect the needed correction at the angle for maximum unbalance in the workpiece, means to operate said apparatuses in correlation whereby all of the measuring intelligence is automatically utilized in controlling the correction for each given workpiece, means to feed successive workpieces to the machine and to successively remove workpieces from the machine automatically in correlation to cycles of measuring and correcting unbalance in said workpieces, and means to repeat the measuring and correcting cycle for each workpiece automatically.

8. A fully automatic balancing machine wherein like rotary workpieces are successively inspected for unbalance, tested for amount and angle of unbalance, and corrected for unbalance without requiring manual touching of the workpiece or a manual reading or actuation other than the initial start and final stop of the machine; comprising, mechanism to load successive workpieces into the machine and to unload successive workpieces from the machine, means to inspect each successive workpiece for unbalance to determine the need for correction, mechanism responsive to said inspection means to actuate said unloader to unload any workpiece from the machine in the event said determination does not call for correction therefor, means responsive to a call for correction from said inspection means to determine both the amount and angular location of unbalance in each workpiece needing correction, mechanism for correcting the unbalance in each such workpiece, means directly responsive to said angle determining means to index each given workpiece relative to said correcting mechanism in accordance with the angular location of unbalance determined for the corresponding workpiece, means directly responsive to said amount determining means to control the amount of correction applied by said correcting mechanism to the corresponding workpiece, means responsive to a completion of correction by said correcting mechanism to inspect the corresponding workpiece for unbalance, means to actuate said unloader mechanism upon completion of the inspection by said last-named means for each successive workpiece, and means to actuate said loader mechanism in correlation with said unloader mechanism whereby successive workpieces are loaded into the machine as successive workpieces are unloaded from the machine.

9. The construction of claim 8 in which automatic means are employed to angularly offset the correction for unbalance where the unbalance exceeds a given amount, and said final inspection re-cycles the unbalance measuring and correcting means to complete the correction for unbalance of such workpiece at another angular location.

10. A fully automatic balancing machine wherein like rotary workpieces are successively tested for amount and angle of unbalance, and corrected for unbalance without requiring manual touching of the workpiece or a manual reading or actuation other than the initial start and final stop of the machine; comprising, mechanism to load successive workpieces into the machine and to unload successive workpieces from the machine, means to determine both the amount and angular location of unbalance in each workpiece, mechanism for correcting the unbalance in each such workpiece, means directly responsive to said angle determining means to index each given workpiece relative to said correcting mechanism in accordance with the angular location of unbalance determined for the corresponding workpiece, means directly responsive to said amount determining means to control the amount of correction applied by said correcting mechanism to the corresponding workpiece, means to actuate said unloader mechanism upon completion of the correction by said last-named means for each successive workpiece, and means to actuate said loader mechanism in correlation with said unloader mechanism whereby successive workpieces are loaded into the machine as successive workpieces are unloaded from the machine.

11. In equipment for balancing a workpiece: mechanism for rotatably supporting a workpiece in a testing station; mechanism for determining the amount and location of unbalance in a correction plane for the workpiece while in said testing station; lift means to move the workpiece from the testing station whereby the workpiece is supported in a correction station; means to clamp said workpiece in said correction station; means for performing a correction operation on said workpiece in said plane while in said correction station; means connected with said testing mechanism for physically positioning said workpiece with respect to said correction mechanism in said correction plane in accordance with the location of unbalance therein; and control means connected with said elements to establish the following operations: to cause said testing mechanism to determine said amount and location of unbalance; to cause said positioning mechanism to operate position said workpiece; to cause said lift mechanism ot move said workpiece to said correction station; to cause said clamp mechanism to clamp said workpiece in said correcting station; and to cause said correction mechanism to perform a correction operation.

12. In apparatus of the class described for measuring and correcting unbalance in a rotary workpiece, means to translate unbalance vibrations in the rotating workpiece into electrical potential pulses having a magnitude proportional to the magnitude of said vibration, means to provide a direct current potential proportional to said potential pulses, a separate source of direct current, means including a variable potentiometer weighing means connected to said source and having its output connected to buck said direct current potential, a motor driving said weighing means to a position where the direct current bucking potential supplied by it equals said first named direct current potential, means to stop said motor at said position for said weighing means, means responsive to said weighing operation of said motor to determine the amount of correction required for unbalance in the workpiece, and means separately responsive to said electrical potential pulses and operative during said weighing to determine the angular position for correction to be applied to the workpiece.

13. The apparatus of claim 12 comprising correction means operative at said determined angular position in response to said last two means to apply correction for unbalance to the workpiece in said determined amount.

14. The apparatus of claim 12 and means responsive to a condition arising from excess unbalance wherein said weighing potentiometer means reaches a position corresponding substantially to the maximum available correction without having completed the bucking of said first named direct current potential to zero to stop said motor and to shift said determined angle, whereby an initial correction is applied at an angle offset from the determined angle and the workpiece may thereafter be rechecked for further correction.

15. The apparatus of claim 13 in which said angle determining means comprises stroboscopic means having a rotary element associated with the rotary workpiece, means to trigger said stroboscopic means in response to said electrical potential pulses, and means to sense the angle of unbalance from said stroboscopic means; and said correction means is disposed at a predetermined angular position relative to said vibration translating means having regard to the rotary axis of the workpiece, and comprises means to shift the phase of the pulse triggering of said stroboscopic means an amount corresponding to the angular displacement between said correction means and said vibration translating means.

16. The apparatus of claim 14 in which said angle determining means comprises stroboscopic means having a rotary element associated with the rotary workpiece, means to trigger said stroboscopic means in response to said electrical potential pulses, means to sense the angle of unbalance from said stroboscopic means; said correction means is disposed at a predetermined angular position relative to said vibration translating means having regard to the rotary axis of the workpiece, and comprises means to shift the phase of the pulse triggering of said stroboscopic means an amount corresponding to the angular displacement between said correction means and said vibration translating means; and said condition responsive means comprises additional means to shift the phase of said stroboscopic triggering means a predetermined amount to provide said offset for initial correction of the workpiece.

17. In apparatus of the class described for measuring the unbalance in a rotary workpiece, means to translate unbalance vibrations in the rotating workpiece into electrical potential pulses having a magnitude and phase corresponding to the magnitude and angular location respectively of unbalance in the workpiece, means utilizing the phase of said pulses to determine the angular location of unbalance in the workpiece, and means operative simultaneously with said last named means and utilizing the magnitude of said pulses independently of the phase thereof to determine the amount of unbalance in the workpiece.

18. The apparatus of claim 17 and means to correct for unbalance in the workpiece, means responsive to said angle determining means to index the workpiece relative to said correcting means, means responsive to said unbalance magnitude determining means to control the amount of correction, and means to automatically actuate all of said means in correlation following initiation of the measuring cycle.

References Cited in the file of this patent

UNITED STATES PATENTS

| | | |
|---|---|---|
| 1,822,075 | Aronoff | Sept. 8, 1931 |
| 1,826,879 | Harrison | Oct. 13, 1931 |
| 2,167,488 | Ohlson | July 25, 1939 |
| 2,243,379 | Johnson | May 27, 1941 |
| 2,383,588 | Bousky | Aug. 28, 1945 |
| 2,492,092 | Bulliet | Dec. 20, 1949 |
| 2,623,429 | Meyer et al. | Dec. 30, 1952 |
| 2,779,217 | Stovall et al. | Jan. 29, 1957 |
| 2,792,725 | Lannen | May 21, 1957 |
| 2,944,424 | Senger | July 12, 1960 |
| 3,044,304 | Bosch et al. | July 17, 1962 |
| 3,087,357 | King | Apr. 30, 1963 |

FOREIGN PATENTS

| | | |
|---|---|---|
| 591,557 | Germany | Jan. 23, 1934 |

OTHER REFERENCES

An article entitled Kurbelwellen-Auswuchtwerk mit selbsttatigem Ausgleich, by K. Federn and H. Hack in MTZ Motor-Technische Zeitschrift, Jahrg. 13, Nr. 5, May 1952, pp. 121–123, copies found in Science Library.

An article by Peter Trippe entitled Automatic Mass Centering and Dynamic Balancing in the Machinist, Feb. 18, 1955, pp. 283–288, copies found in Science Library.